(12) United States Patent
Inoue et al.

(10) Patent No.: US 10,252,773 B2
(45) Date of Patent: Apr. 9, 2019

(54) BICYCLE FRONT DERAILLEUR

(71) Applicant: Shimano Inc., Sakai, Osaka (JP)

(72) Inventors: Kenkichi Inoue, Osaka (JP); Akinobu Sugimoto, Osaka (JP)

(73) Assignee: Shimano Inc., Osaka (JP)

( * ) Notice: Subject to any disclaimer, the term of this patent is extended or adjusted under 35 U.S.C. 154(b) by 120 days.

(21) Appl. No.: 15/279,178

(22) Filed: Sep. 28, 2016

(65) Prior Publication Data

US 2017/0283005 A1 Oct. 5, 2017

Related U.S. Application Data

(63) Continuation-in-part of application No. 15/091,041, filed on Apr. 5, 2016.

(51) Int. Cl.
| | |
|---|---|
| *B62M 9/00* | (2006.01) |
| *B62M 9/10* | (2006.01) |
| *B62M 9/135* | (2010.01) |
| *B62M 9/136* | (2010.01) |
| *B62M 9/137* | (2010.01) |
| *F16H 55/30* | (2006.01) |
| *B62M 9/1346* | (2010.01) |

(52) U.S. Cl.
CPC ............. *B62M 9/136* (2013.01); *B62M 9/00* (2013.01); *B62M 9/105* (2013.01); *B62M 9/135* (2013.01); *B62M 9/137* (2013.01); *B62M 9/1346* (2013.01); *F16H 55/30* (2013.01)

(58) Field of Classification Search
CPC .... B62M 9/136; B62M 9/1342; B62M 9/137; B62M 9/135; Y10T 744/20438

USPC ...................................................... 474/80, 82
See application file for complete search history.

(56) References Cited

U.S. PATENT DOCUMENTS

| | | | | | |
|---|---|---|---|---|---|
| 4,424,048 | A | * | 1/1984 | Shimano | B62M 9/137 474/82 |
| 4,617,006 | A | * | 10/1986 | Nagano | B62M 9/1342 474/78 |
| 5,738,603 | A | * | 4/1998 | Schmidt | B62M 9/10 474/158 |
| 5,779,580 | A | * | 7/1998 | White | B62M 9/1342 474/80 |
| 5,779,581 | A | * | 7/1998 | Fujii | B62M 9/136 474/80 |
| 6,629,903 | B1 | * | 10/2003 | Kondo | B62M 9/1346 474/80 |
| 6,923,740 | B2 | * | 8/2005 | Nanko | B62M 9/1342 474/78 |
| 6,979,009 | B2 | * | 12/2005 | Ichida | B62M 9/132 280/238 |

(Continued)

*Primary Examiner* — Henry Y Liu
(74) *Attorney, Agent, or Firm* — Global IP Counselors, LLP

(57) ABSTRACT

A bicycle front derailleur is basically provided with a base member, a chain guide and a chain restricting abutment. The base member is configured to be mounted on a bicycle frame. The chain guide is configured to be movably coupled to the base member between a retracted position and an extended position to move a bicycle chain. The chain restricting abutment is configured to restrict the bicycle chain from moving in a radially outward direction of a rotational center axis of a bicycle front sprocket when the base member is mounted on the bicycle frame and the chain guide moves from the extended position toward the retracted position.

35 Claims, 27 Drawing Sheets

(56) References Cited

U.S. PATENT DOCUMENTS

| | | | | |
|---|---|---|---|---|
| 7,014,584 B2* | 3/2006 | Nanko | B62M 9/1342 | 474/80 |
| 7,438,657 B2* | 10/2008 | Nakai | B62M 9/1342 | 474/80 |
| 7,806,792 B2* | 10/2010 | Fujii | B62M 9/136 | 474/80 |
| 7,867,118 B2* | 1/2011 | Yamamoto | B62M 9/136 | 474/80 |
| 7,963,871 B2* | 6/2011 | Peh | B62M 9/136 | 474/82 |
| 8,241,158 B2* | 8/2012 | Ishikawa | B62M 25/08 | 474/80 |
| 8,444,514 B2* | 5/2013 | Nankou | B62M 9/136 | 474/82 |
| 8,485,924 B2* | 7/2013 | Fujii | B62M 9/136 | 285/15 |
| 8,491,428 B2* | 7/2013 | Emura | B62M 9/136 | 474/3 |
| 8,678,962 B2* | 3/2014 | Jordan | B62M 9/131 | 29/428 |
| 8,678,963 B2* | 3/2014 | Kuwayama | B62M 9/1348 | 474/80 |
| 8,715,120 B2* | 5/2014 | Florczyk | B62M 9/136 | 474/80 |
| 8,777,788 B2* | 7/2014 | Kawakami | B62M 9/1344 | 474/80 |
| 8,808,123 B2* | 8/2014 | Inoue | B62M 9/136 | 474/80 |
| 8,932,162 B2* | 1/2015 | Emura | B62M 9/131 | 474/80 |
| 8,979,683 B2* | 3/2015 | Katsura | B62M 25/08 | 474/80 |
| 9,156,524 B2* | 10/2015 | Emura | B62M 9/1242 | |
| 9,156,525 B2* | 10/2015 | Emura | B62M 9/135 | |
| 9,248,885 B2* | 2/2016 | Emura | B62M 9/1242 | |
| 9,499,232 B2* | 11/2016 | Emura | B62M 9/135 | |
| 9,873,481 B2* | 1/2018 | Braedt | B62M 9/12 | |
| 2004/0185975 A1* | 9/2004 | Chen | B62M 9/1344 | 474/80 |
| 2005/0272541 A1* | 12/2005 | Valle | B62M 9/136 | 474/80 |
| 2006/0019782 A1* | 1/2006 | Wickliffe | B62M 9/134 | 474/80 |
| 2007/0060427 A1* | 3/2007 | Nankou | B62M 9/136 | 474/80 |
| 2007/0191158 A1* | 8/2007 | Ichida | B62M 9/136 | 474/80 |
| 2007/0197324 A1* | 8/2007 | Fujii | B62M 9/136 | 474/80 |
| 2008/0167148 A1* | 7/2008 | Siah | B62M 9/1342 | 474/80 |
| 2008/0182689 A1* | 7/2008 | Fujii | B62M 9/136 | 474/82 |
| 2011/0183795 A1* | 7/2011 | Emura | B62M 9/136 | 474/80 |
| 2013/0072333 A1* | 3/2013 | Kuwayama | B62M 9/1348 | 474/82 |
| 2013/0085025 A1* | 4/2013 | Inoue | B62M 9/136 | 474/80 |
| 2015/0018146 A1* | 1/2015 | Emura | B62M 9/1342 | 474/80 |
| 2015/0094177 A1* | 4/2015 | Emura | B62M 9/1242 | 474/80 |
| 2015/0094178 A1* | 4/2015 | Emura | B62M 9/1242 | 474/80 |
| 2015/0115568 A1* | 4/2015 | Emura | B62M 9/135 | 280/261 |
| 2016/0068225 A1* | 3/2016 | Kuwayama | B62M 9/1342 | 474/80 |
| 2016/0101825 A1* | 4/2016 | Braedt | B62M 9/12 | 474/160 |
| 2016/0229488 A1* | 8/2016 | Kuwayama | B62M 9/1344 | |

* cited by examiner

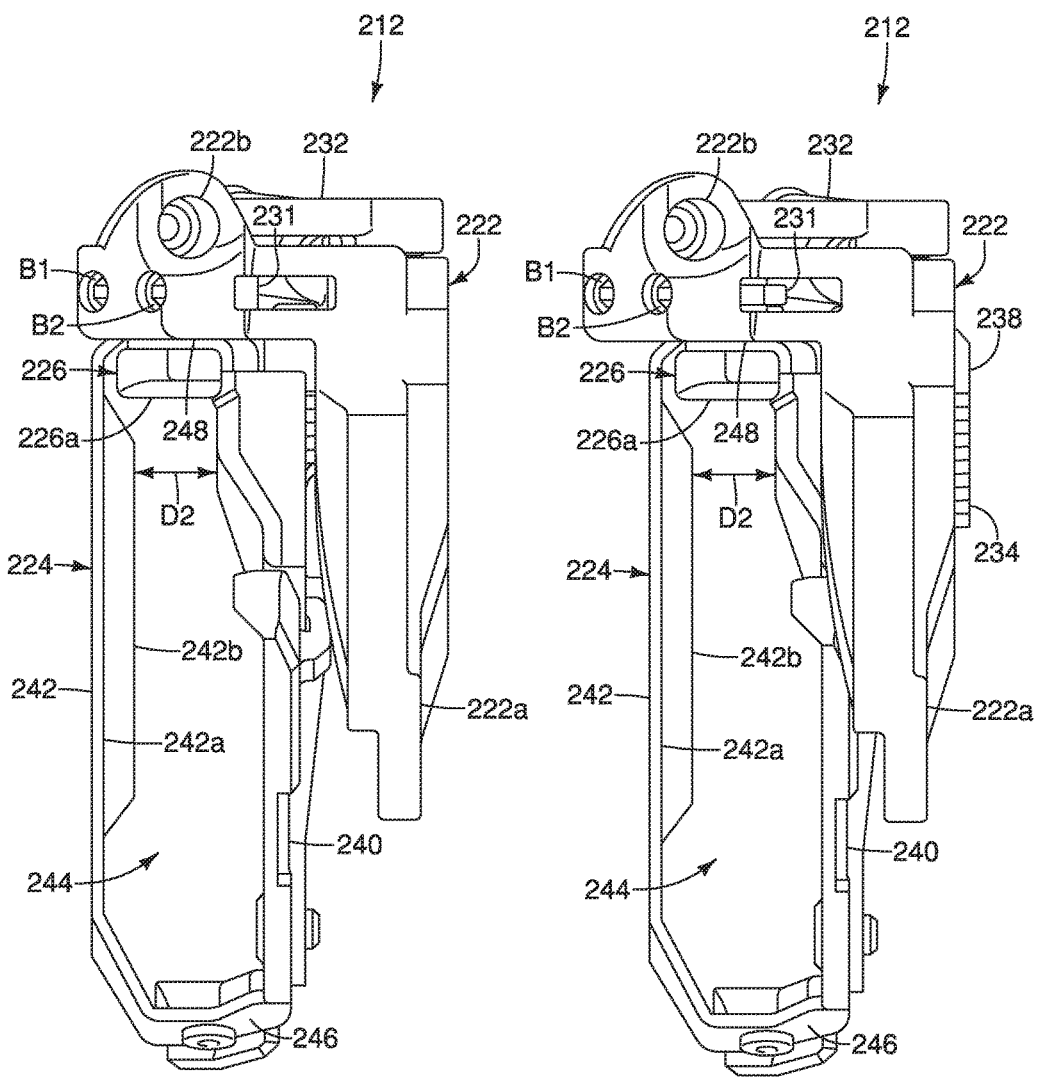

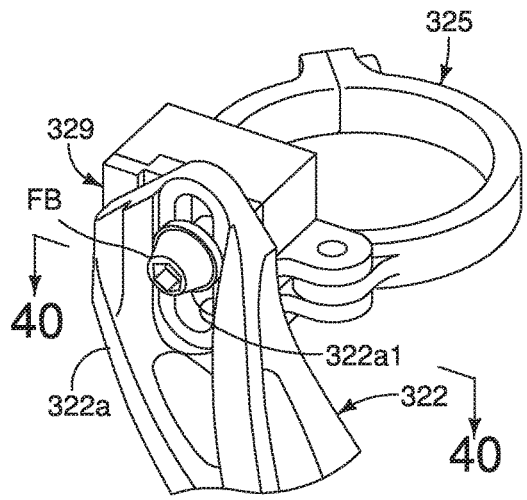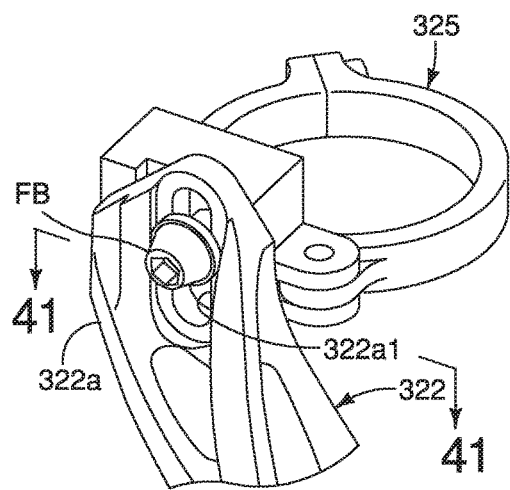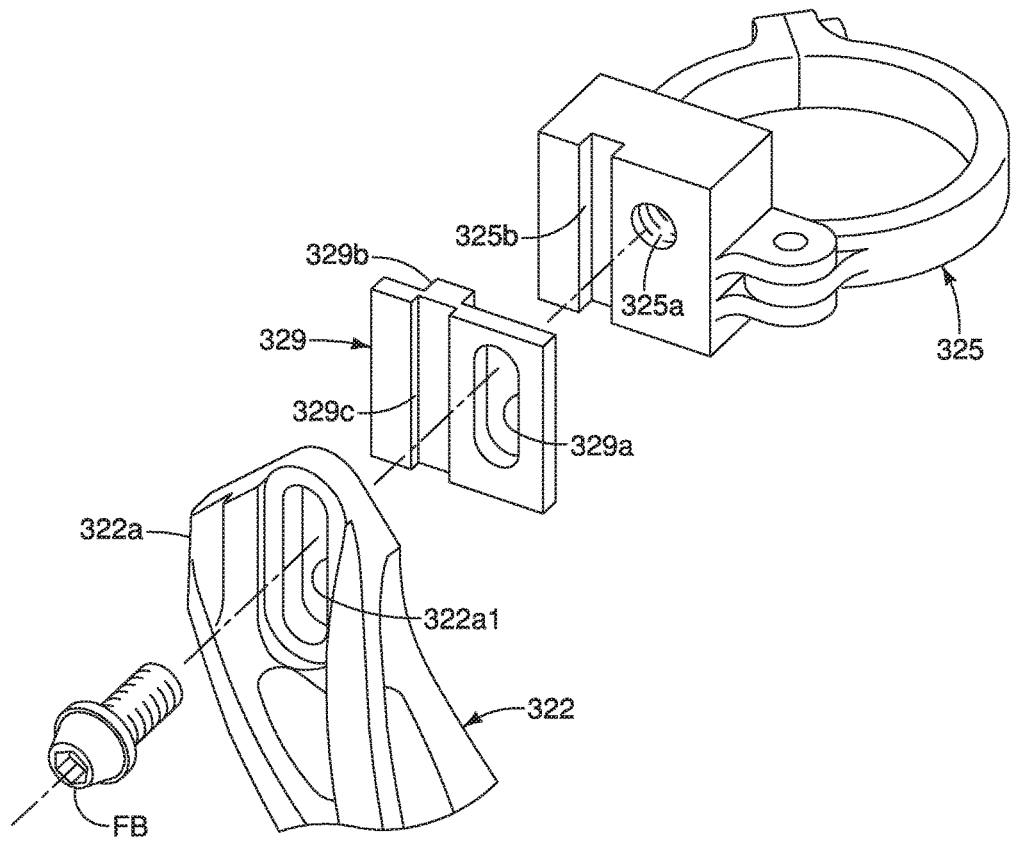

BICYCLE FRONT DERAILLEUR

BACKGROUND

Field of the Invention

This invention generally relates to a bicycle front derailleur. More specifically, the present invention relates to a bicycle front derailleur having a chain guide that is movable between a retracted position and an extended position to move a bicycle chain between front sprockets.

Background Information

Many bicycles are provided with a drivetrain that allows the rider to changing a gear ratio for transferring power from the pedals to the rear wheel. Often the drivetrain uses one or more derailleurs to change the gear ratio. A front derailleur is mounted to the bicycle frame adjacent to front sprockets to shift a chain laterally between the front sprockets, while a rear derailleur is mounted adjacent to a hub of the rear wheel to shift the chain laterally between rear sprockets. In either case, the derailleur typically includes a fixed or base member that is non-movably secured to the bicycle frame, and a chain guide. The chain guide is movably supported relative to the base member to move between at least two lateral shift positions. Typically, a linkage assembly is coupled between the fixed member and the chain guide in order to movably support the movable member with the chain guide. The derailleur is typically operated by an operation cable that is coupled between a shifter and the derailleur.

SUMMARY

Generally, the present disclosure is directed to various features of a bicycle front derailleur. One object of the present invention is to provide a bicycle front derailleur that can provide a more reliable shifting from a larger front sprocket to a smaller front sprocket.

In view of the state of the known technology and in accordance with a first aspect of the present disclosure, a bicycle front derailleur is basically provided that comprises a base member, a chain guide and a chain restricting abutment. The base member is configured to be mounted on a bicycle frame. The chain guide is configured to be movably coupled to the base member between a retracted position and an extended position to move a bicycle chain. The chain restricting abutment is configured to restrict the bicycle chain from moving in a radially outward direction of a rotational center axis of a bicycle front sprocket when the base member is mounted on the bicycle frame and the chain guide moves from the extended position toward the retracted position. With this configuration, the chain restricting abutment of the bicycle front derailleur aid in smooth shifting from a large sprocket to a smaller sprocket.

In accordance with a second aspect of the present invention, the bicycle front derailleur according to the first aspect is configured so that the chain guide includes an inner guide plate and an outer guide plate. The outer guide plate includes a base plate portion and a chain guiding portion protruding from the base plate portion toward the inner guide plate. The chain guiding portion is configured to contact a side surface of the bicycle chain when the base member is mounted on the bicycle frame and the chain guide moves from the extended position toward the retracted position. A first axial distance is defined between the chain restricting abutment and the inner guide plate that is smaller than a second axial distance defined between the chain guiding portion and the inner guide plate. With this configuration, the chain restricting abutment further aid in smooth shifting from a large sprocket to a smaller sprocket.

In accordance with a third aspect of the present invention, the bicycle front derailleur according to the first or second aspect is configured so that the chain restricting abutment is disposed on a downstream side of the chain guiding portion with respect to a chain driving direction. With this configuration, the chain restricting abutment does not interfere with the chain during riding.

In accordance with a fourth aspect of the present invention, the bicycle front derailleur according to any one of the first to third aspects is configured so that the chain guide includes an inner guide plate and an outer guide plate. The outer guide plate including a base plate portion and a chain guiding portion protruding from the base plate portion toward the inner guide plate. The chain guiding portion is configured to contact a side surface of the bicycle chain when the base member is mounted on the bicycle frame and the chain guide moves from the extended position toward the retracted position. The outer guide plate is configured to define a non-contact space between the chain restricting abutment and the chain guiding portion in a chain driving direction. The non-contact space is configured not to contact the bicycle chain when the base member is mounted on the bicycle frame and the chain guide moves from the extended position toward the retracted position. With this configuration, the chain restricting abutment does not interfere with the chain during riding.

In accordance with a fifth aspect of the present invention, the bicycle front derailleur according to any one of the first to fourth aspects is configured so that the chain restricting abutment is disposed on the base member. With this configuration, the chain restricting abutment can be easily provided.

In accordance with a sixth aspect of the present invention, the bicycle front derailleur according to the fifth aspect is configured so that the chain restricting abutment is disposed at a front end of the base member. With this configuration, the chain restricting abutment does not interfere with the chain during riding.

In accordance with a seventh aspect of the present invention, the bicycle front derailleur according to the fifth aspect is configured so that the chain restricting abutment is disposed on a downwardly facing surface of the base member. With this configuration, the chain restricting abutment can reliably contact the chain to ensure smooth shifting from a large sprocket to a smaller sprocket.

In accordance with an eighth aspect of the present invention, the bicycle front derailleur according to the seventh aspect is configured so that the chain guide includes an inner guide plate and an outer guide plate, and the chain restricting abutment includes a protrusion disposed between the inner guide plate and the outer guide plate as viewed from a direction perpendicular to the rotational center axis when the base member is mounted on the bicycle frame. With this configuration, the chain restricting abutment can be inexpensively provided on the chain guide.

In accordance with a ninth aspect of the present invention, the bicycle front derailleur according to any one of the first to eighth aspects is configured so that the chain guide includes an inner guide plate and an outer guide plate, and the chain restricting abutment is disposed on an outer guide plate of the chain guide. With this configuration, the chain restricting abutment can be provided properly located.

In accordance with a tenth aspect of the present invention, the bicycle front derailleur according to the ninth aspect is configured so that the chain restricting abutment is disposed forward of the inner guide plate. With this configuration, the chain restricting abutment does not interfere with the chain during riding.

In accordance with an eleventh aspect of the present invention, the bicycle front derailleur according to the tenth aspect is configured so that the chain restricting abutment is integrally formed as a one-piece member of the outer guide plate. With this configuration, the chain restricting abutment can be inexpensively provided.

In accordance with a twelfth aspect of the present invention, the bicycle front derailleur according to the ninth aspect is configured so that the chain restricting abutment is disposed at a front end of the outer guide plate. With this configuration, the chain restricting abutment does not interfere with the chain during riding.

In accordance with a thirteenth aspect of the present invention, the bicycle front derailleur according to the twelfth aspect is configured so that the outer guide plate includes a base plate portion and a chain guiding portion protruding from the base plate portion toward the inner guide plate. The chain guiding portion is configured to contact a side surface of the bicycle chain when the base member is mounted on the bicycle frame and the chain guide moves from the extended position toward the retracted position. The chain restricting abutment is aligned with the chain guiding portion in a direction extending parallel to a chain driving direction. With this configuration, the chain restricting abutment does not interfere with the chain during riding and reliably contacts the chain to ensure smooth shifting from a large sprocket to a smaller sprocket.

In accordance with a fourteenth aspect of the present invention, the bicycle front derailleur according to any one of the first to thirteenth aspects is configured so that the chain guide includes an inner guide plate, an outer guide plate and a connecting part. The connecting part extends between the inner guide plate and the outer guide plate. The chain restricting abutment is disposed on the connecting part of the chain guide. With this configuration, the chain restricting abutment can be inexpensively provided.

In accordance with a fifteenth aspect of the present invention, the bicycle front derailleur according to the fourteenth aspect is configured so that the chain restricting abutment is disposed at a front end of the chain guide. With this configuration, the chain restricting abutment does not interfere with the chain during riding.

In accordance with a sixteenth aspect of the present invention, the bicycle front derailleur according to the fourteenth aspect is configured so that the chain restricting abutment includes a protrusion protruding from the connecting part between the inner guide plate and the outer guide plate. With this configuration, the chain restricting abutment can be inexpensively provided.

In accordance with a seventeenth aspect of the present invention, the bicycle front derailleur according to any one of the first to sixteenth aspects is configured so that the chain restricting abutment is configured to contact an outer periphery of the bicycle chain when the base member is mounted on the bicycle frame and the bicycle chain moves from a larger front sprocket toward an adjacent smaller front sprocket. With this configuration, the chain restricting abutment does not interfere with the chain during riding and reliably contacts the chain to ensure smooth shifting from a large sprocket to a smaller sprocket.

In accordance with an eighteenth aspect of the present invention, the bicycle front derailleur according to any one of the first to seventeenth aspects is configured so that the chain restricting abutment is at least partially made of an elastic material. With this configuration, the chain restricting abutment will not damage the chain.

In accordance with a nineteenth aspect of the present invention, the bicycle front derailleur according to any one of the first to eighteenth aspects is configured so that the chain restricting abutment is configured to be elastically deformed by the bicycle chain that moves in the radially outward direction when the base member is mounted on the bicycle frame and the chain guide moves from the retracted position toward the extended position. With this configuration, the chain restricting abutment can elastically deformed to avoid damage to the chain and/or the bicycle front derailleur.

In accordance with a twentieth aspect of the present invention, the bicycle front derailleur according to any one of the first to nineteenth aspects is configured so that the chain restricting abutment is at least partially made of a non-metallic material. With this configuration, the chain restricting abutment will be lightweight and inexpensive.

In accordance with a twenty-first aspect of the present invention, the bicycle front derailleur according to the twentieth aspect is configured so that the chain restricting abutment is at least partially made of a resin material. With this configuration, the chain restricting abutment can be inexpensively made.

In accordance with a twenty-second aspect of the present invention, the bicycle front derailleur according to the twentieth aspect is configured so that the chain restricting abutment is at least partially made of an elastomer. With this configuration, the chain restricting abutment will not damage the chain.

In accordance with a twenty-third aspect of the present invention, the bicycle front derailleur according to any one of the first to twenty-first aspects is configured so that the chain restricting abutment includes an internal space. With this configuration, the chain restricting abutment can more easily elastically deform to avoid damage to the chain and/or the bicycle front derailleur.

In accordance with a twenty-fourth aspect of the present invention, the bicycle front derailleur according to the twenty-third aspect is configured so that the chain restricting abutment includes a through hole that comprises the internal space of the chain restricting abutment. With this configuration, the internal space can be easily formed.

In accordance with a twenty-fifth aspect of the present invention, a bicycle drive train assembly includes the bicycle front derailleur according to any one of the first to twenty-first aspects. The bicycle drive train assembly further comprises a first sprocket and a second sprocket. The first sprocket includes a first body portion and a plurality of first teeth disposed on an outer periphery of the first body portion. The second sprocket includes a second body portion and a plurality of second teeth disposed on an outer periphery of the second body portion. The second sprocket has a fewer total number of the second teeth than a total number of the first teeth of the first sprocket. With this configuration, the bicycle front derailleur can shift a chain between a first sprocket and a second sprocket.

In accordance with a twenty-sixth aspect of the present invention, the bicycle drive train assembly according to the twenty-fifth aspect is configured so that the first teeth of the first sprocket include a set of downshift teeth configured to define a predetermined shift gate in which the bicycle chain shifts towards the second sprocket to move from the first sprocket to the second sprocket. With this configuration, smooth and reliable downshifting can be performed.

In accordance with a twenty-seventh aspect of the present invention, the bicycle drive train assembly according to the twenty-fifth aspect is configured so that the first teeth of the first sprocket include a set of first downshift teeth, a set of second downshift teeth, a set of first driving teeth, and a set of second driving teeth. The first downshift teeth being configured to define a first predetermined shift gate in which the bicycle chain shifts towards the second sprocket to move from the first sprocket to the second sprocket. The second downshift teeth being configured to define a second predetermined shift gate in which the bicycle chain shifts towards the second sprocket to move from the first sprocket to the second sprocket. The first driving teeth being disposed between the first and second downshift teeth on an upstream side of the first downshift teeth with respect to a chain driving direction. The second driving teeth being disposed between the first and second downshift teeth on a downstream side of the first downshift teeth with respect to the chain driving direction. With this configuration, smooth and reliable downshifting can be performed.

In accordance with a twenty-eighth aspect of the present invention, the bicycle drive train assembly according to the twenty-fifth aspect is configured so that the first teeth of the first sprocket include at least one downshift tooth and at least one driving tooth. The at least one downshift tooth has a first radial tooth height. The at least one driving tooth has a second radial tooth height that is larger than the first radial tooth height. With this configuration, downshifting can be reliably performed.

In accordance with a twenty-ninth aspect of the present invention, the bicycle drive train assembly according to the twenty-fifth aspect is configured so that the plurality of first teeth includes: at least one outer-link plate engaging tooth having a first chain engaging tooth width; and at least one inner-link plate engaging tooth having a second chain engaging tooth width. The first chain engaging tooth width is larger than an inner link space defined between an opposed pair of inner link plates of the bicycle chain, and is smaller than an outer link space defined between an opposed pair of outer link plates of the bicycle chain. The second chain engaging tooth width is smaller than the inner link space. With this configuration, reliable and firm engagement between chain and the sprocket can be obtained.

In accordance with a thirtieth aspect of the present invention, the bicycle drive train assembly according to the twenty-ninth aspect is configured so that the chain restricting abutment is disposed on the base member. With this configuration, the chain restricting abutment can be easily provided.

In accordance with a thirty-first aspect of the present invention, the bicycle drive train assembly according to the thirtieth aspect is configured so that the chain restricting abutment is disposed at a front side of a front end of the chain guide. With this configuration, the chain restricting abutment does not interfere with the chain during riding.

In accordance with a thirty-second aspect of the present invention, the bicycle drive train assembly according to the thirtieth aspect is configured so that the chain restricting abutment is at least partially made of a non-metallic material. With this configuration, the chain restricting abutment will be lightweight and inexpensive.

In accordance with a thirty-third aspect of the present invention, the bicycle drive train assembly according to the thirtieth aspect is configured so that the chain restricting abutment includes an internal space. With this configuration, the chain restricting abutment can more easily elastically deform to avoid damage to the chain and/or the bicycle front derailleur.

In accordance with a thirty-fourth aspect of the present invention, the bicycle drive train assembly according to the thirty-third aspect is configured so that the chain restricting abutment includes a through hole that comprises the internal space of the chain restricting abutment. With this configuration, the internal space can be easily formed.

Also other objects, features, aspects and advantages of the disclosed bicycle front derailleur will become apparent to those skilled in the art from the following detailed description, which, taken in conjunction with the annexed drawings, discloses several illustrative embodiments of a bicycle front derailleur.

BRIEF DESCRIPTION OF THE DRAWINGS

Referring now to the attached drawings which form a part of this original disclosure:

FIG. 26 is an enlarged front end elevational view of the bicycle front derailleur illustrated in FIG. 25 with its chain guide in an extended position with respect to the base member;

FIG. 27 is an enlarged front end elevational view of the bicycle front derailleur illustrated in FIGS. 25 and 26 with its chain guide in a retracted position with respect to the base member;

FIG. 37 is a partial perspective view of a portion of the base member of the bicycle front derailleur illustrated in FIGS. 28 to 33 in which a spacer is used for optimizing the position of the bicycle front derailleur for use with the first bicycle drive train of FIG. 35;

FIG. 38 is a partial perspective view of a portion of the base member of the bicycle front derailleur illustrated in FIGS. 28 to 33 in which the spacer of FIG. 37 is not used so that the position of the bicycle front derailleur is optimized for use with the second bicycle drive train of FIG. 36;

FIG. 39 is an exploded perspective view of the portion of the base member of the bicycle front derailleur, the spacer and the mounting clamp shown in FIG. 38.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
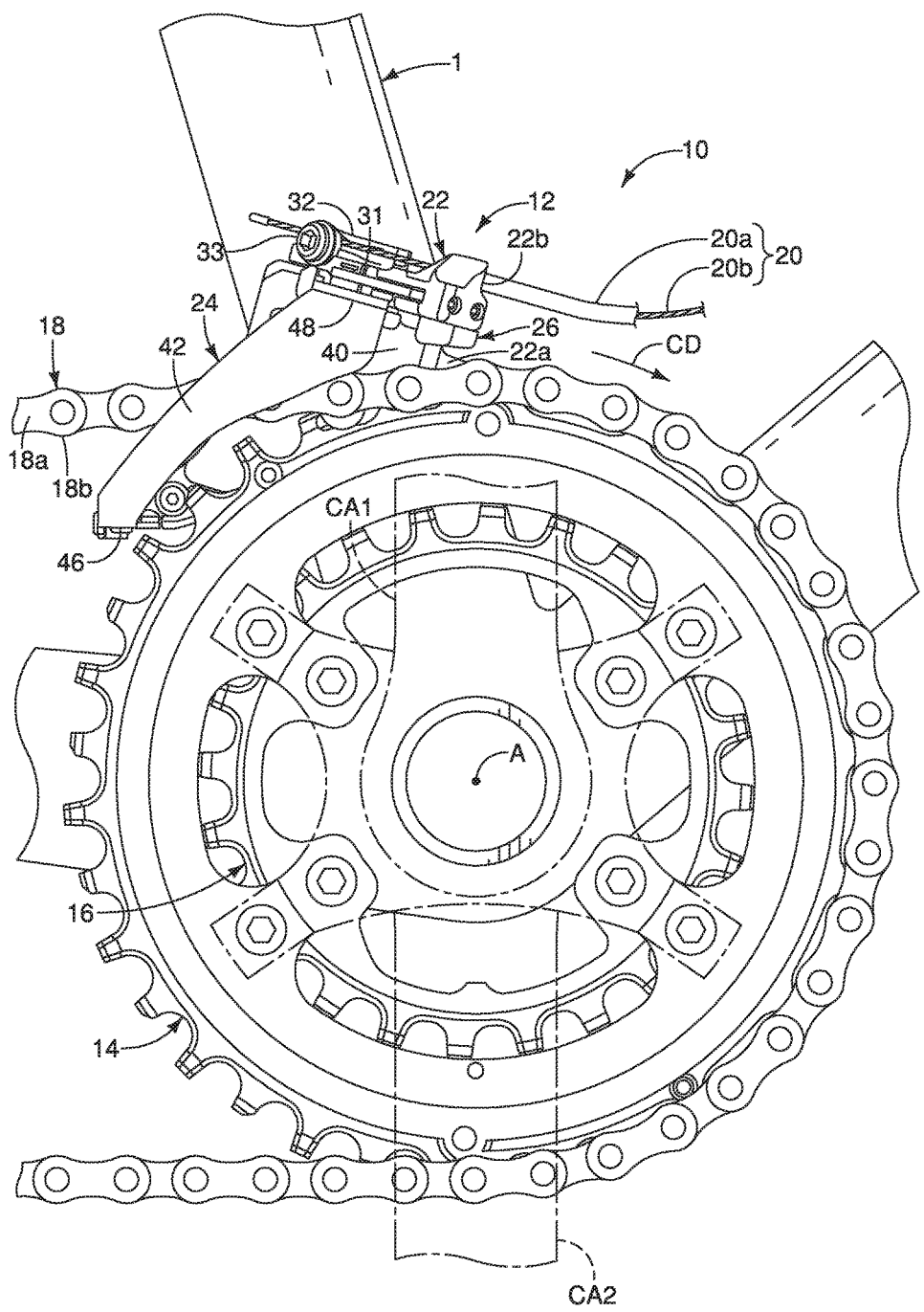
FIG. 1 is a partial side elevational view of a bicycle frame with a bicycle drive train assembly that includes a bicycle front derailleur, a first sprocket and a second sprocket with the bicycle front derailleur having a base member mounted to the bicycle frame for shifting a bicycle chain between the first and second sprockets in accordance with a first illustrated embodiment.

Referring initially to FIG. 1, a portion of a bicycle frame 1 is illustrated that is equipped with a bicycle drive train assembly 10 that includes a bicycle front derailleur 12 (hereinafter "the front derailleur 12") in accordance with a first embodiment. The bicycle drive train assembly 10 further comprises a first sprocket 14 and a second sprocket 16. The first and second sprockets 14 and 16 are rotated by a pair of crank arms CA1 and CA2 to rotate about a rotational center axis A. The first sprocket 14 is a larger front sprocket with respect to the second sprocket 16, which is an adjacent smaller front sprocket with respect to the first sprocket 14. While the bicycle drive train assembly 10 is illustrated with only two front sprockets, it will be apparent to those skilled in the bicycle field from this disclosure that the bicycle drive train assembly 10 can include more than two front sprockets if needed and/or desired.

Basically, the front derailleur 12 is configured to laterally shift a bicycle chain 18 between the first and second sprockets 14 and 16. Here, the front derailleur 12 is a cable operated front derailleur that is operatively connected to a shifter (not shown) using an operation cable 20. However, the front derailleur 12 can be configured to be operated in other ways such as electrically operated, hydraulically operated or pneumatically operated.

In the first embodiment, the operation cable 20 includes an outer casing 20a and an inner cable 20b passing through the outer casing 20a. Thus, in the illustrated embodiment, the operation cable 20 is a conventional Bowden cable. The inner cable 20b is slidably disposed inside the outer casing 20a. In particular, operation of the shifter (not shown) moves (i.e., pulls or releases) the inner cable 20b inside the outer casing 20a to operate the front derailleur 12. The outer casing 20a can be formed as a single continuous tubular member with one end contacting a part of the shifter (not shown) and the other end contacting the front derailleur 12, as illustrated. Alternatively, the outer casing 20a can be formed of two or more pieces as is commonly done on many bicycles.

In the first embodiment, as seen in FIG. 1, the front derailleur 12 is mounted on a hanger tube of the bicycle frame 1 using a conventional bracket (not shown) that is attached to the hanger tube by a bottom bracket (not shown). However, it will be apparent to those skilled in the bicycle field from this disclosure that the front derailleur 12 can be attached directly to a seat tube of the bicycle frame 1 in a conventional manner, if needed and/or desired.

Referring now to FIGS. 2 to 12, the front derailleur 12 will now be described in more detail. The front derailleur 12 basically comprises a base member 22, a chain guide 24 and a chain restricting abutment 26. Basically, in the first embodiment, the base member 22 is configured to be mounted on the bicycle frame 1 in a conventional manner. The chain guide 24 is configured to be movably coupled to the base member 22 between a retracted position and an extended position to move the bicycle chain 18. In other words, the chain guide 24 is configured to be movable with respect to the base member 22 between an extended position (see FIGS. 4, 6 and 8) and a retracted position (see FIGS. 5, 7 and 9) at which the chain guide 24 is farther from the base member 22 than the retracted position.

In particular, the front derailleur 12 further comprises a first link member 31 and a second link member 32 that interconnect the base member 22 and the chain guide 24 together for lateral movement with respect to the bicycle frame 1. In other words, the first and second link members 31 and 32 define a linkage assembly for movably supporting the chain guide 24 with respect to the base member 22 between the extended position (see FIGS. 4, 6 and 8) and the retracted position (see FIGS. 5, 7 and 9). The first and second link members 31 and 32 are each a rigid member that is made of a suitable material such as a metallic material or a fiber reinforced plastic material. Here in the illustrated embodiment, the first link member 31 is an outer link, while the second link member 32 is an inner link.

The first link member 31 is pivotally coupled to the base member 22 about a pivot axis P1. The first link member 31 is pivotally coupled to the chain guide 24 about a second pivot axis P2. The second link member 32 is pivotally coupled to the base member 22 about a third pivot axis P3.

Figure 7:
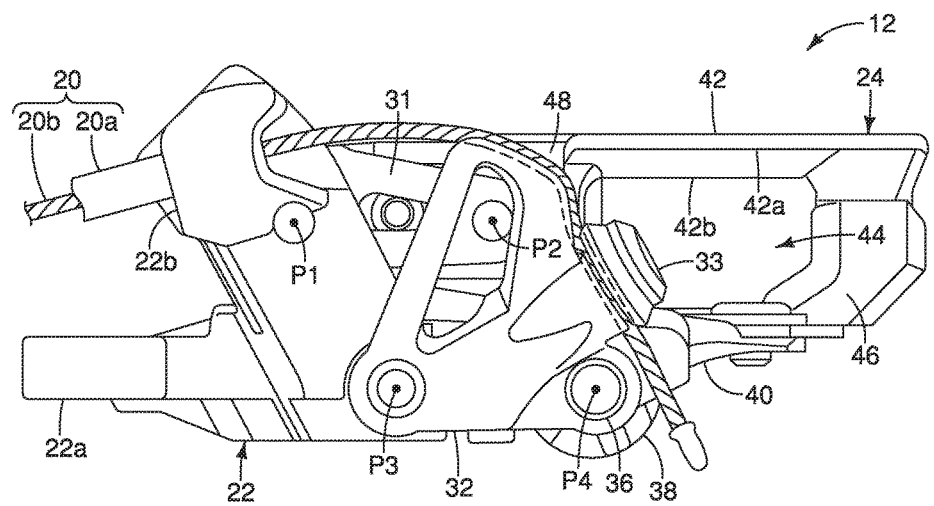
FIG. 7 is an enlarged top view of the bicycle front derailleur illustrated in FIGS. 1 to 6 with the chain guide in the retracted position with respect to the base member.

The second link member 32 is pivotally coupled to chain guide 24 about a fourth pivot axis P4. With this arrangement, as seen in FIG. 7, a four bar linkage is defined by the pivot axes P1, P2, P3 and P4. Also with the arrangement of the first and second link members 31 and 32, the movement of chain guide 24 is in a generally horizontal plane such that the chain guide 24 swings a forward and rear direction with respect to the frame 1 as the chain guide 24 swings laterally with respect to the frame 1 between the extended position (see FIGS. 4, 6 and 8) and the retracted position (see FIGS. 5, 7 and 9). A cable attachment bolt 33 is screwed into a threaded bore of the second link member 32 for fixedly attaching the inner cable 20b to the second link member 32.

Figure 3:
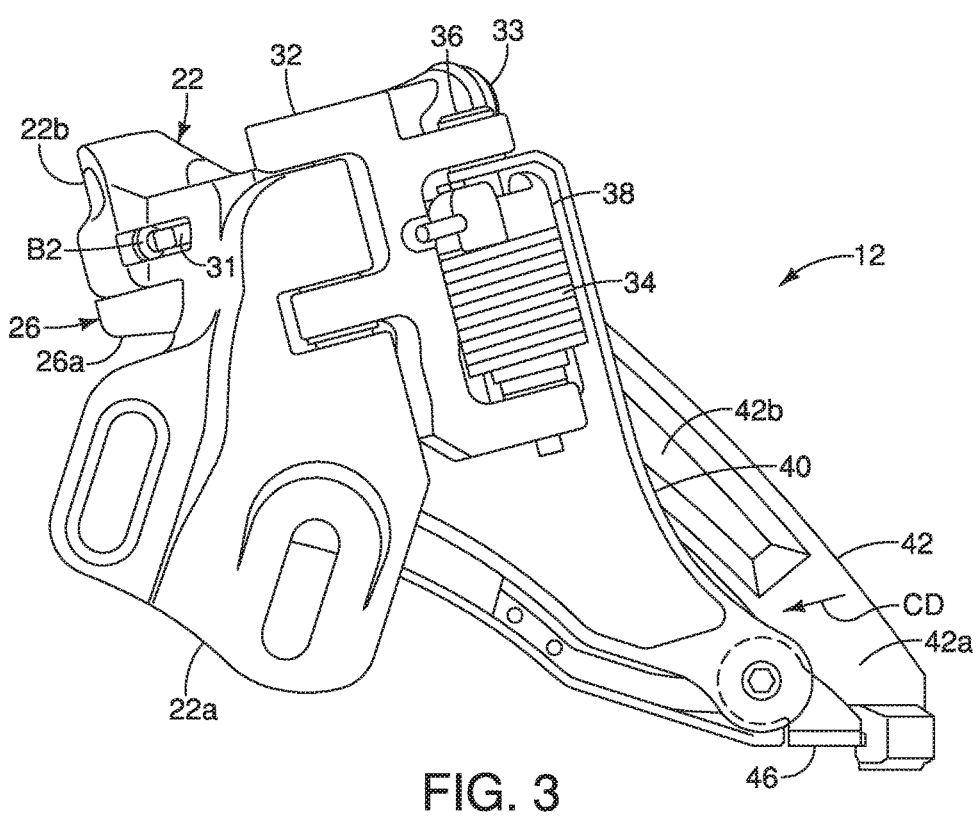
FIG. 3 is an enlarged inner side elevational view of the bicycle front derailleur illustrated in FIGS. 1 and 2.

Here, as seen in FIG. 3, the front derailleur 12 further comprises a biasing member 34 that is operatively provided between the chain guide 24 and the second link member 32 to bias the chain guide 24 towards the retracted position. Alternatively, the biasing member 34 could be arranged to bias the chain guide 24 towards the extended position, if needed and/or desired. In the illustrated embodiment, as seen in FIG. 3, the biasing member 34 is a torsion spring. The biasing member 34 has a coiled portion mounted on a pivot pin 36 that pivotally supports the second link member 32 to the base member 22 about the third pivot axis P3. A first end of the biasing member 34 is engaged with the chain guide 24. For example, as in the illustrated embodiment, the first end of the biasing member 34 is hooked on the chain guide 24. A second end of the biasing member 34 is fixed to an adjustment collar 38 that is fixed to the second link member 32.

When the front derailleur 12 is used with the bicycle drive train assembly having only the front sprockets 14 and 16, the chain guide 24 has at least two positions that are established by a shifter (not shown). However, for example, when the front derailleur 12 is used with a bicycle drive train assembly having three front sprockets, the chain guide 24 has three positions that are established by a shifter (not shown).

Figure 2:
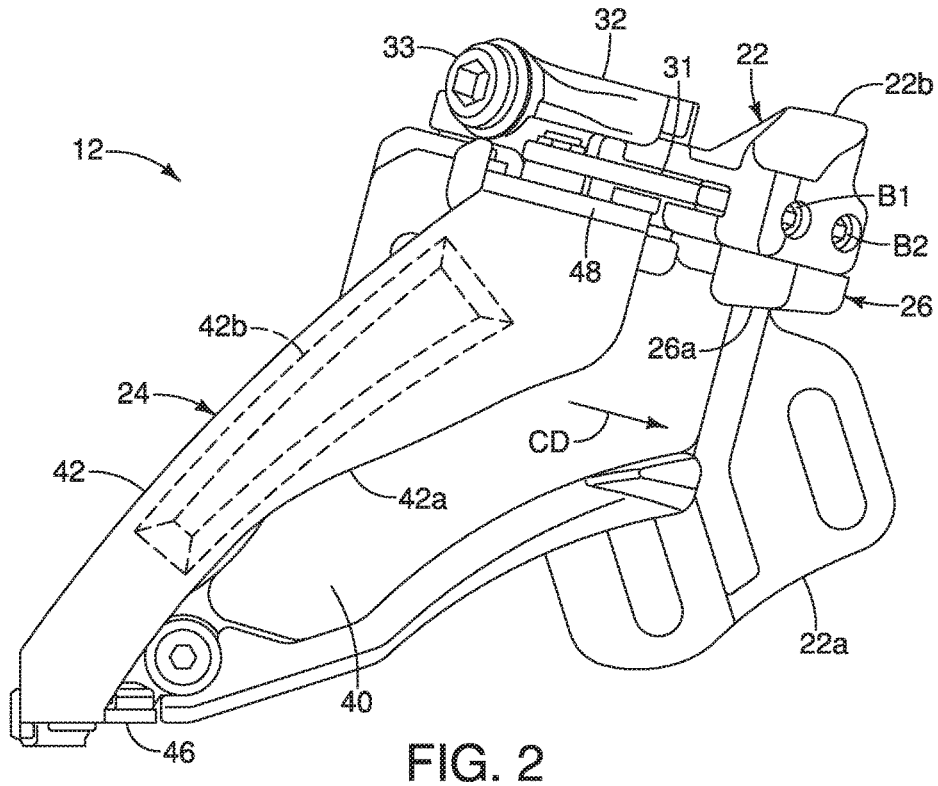
FIG. 2 is an enlarged outer side elevational view of the bicycle front derailleur illustrated in FIG. 1.

As seen in FIG. 1, the base member 22 is configured to be attached to the bicycle 10 above the front sprockets 14 and 16. The base member 22 is a rigid member that is made of a suitable material such as a metallic material or a plastic material. As seen in FIGS. 2 and 3, the base member 22 has a frame mounting portion 22a that has two slots for receiving bolts (not shown) for mounting the front derailleur 12 to the frame 1 via a mounting bracket (not shown). The base member 22 also has a cable receiving portion 22b that receives the operation cable 20. Here, the cable receiving portion 22b has a stepped bore such that an outer casing abutment surface is formed between a first large diameter bore section and a second small diameter bore section. The first large diameter bore section is sized for receiving the outer casing 20a that abuts against the outer casing abutment surface. The second small diameter bore section is sized for receiving the inner cable 20b therethrough.

Figure 4:
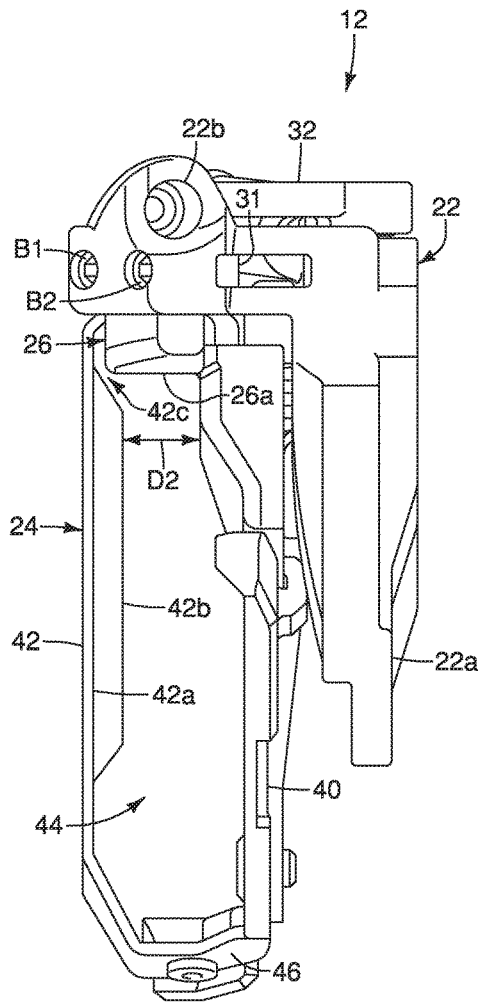
FIG. 4 is an enlarged front end elevational view of the bicycle front derailleur illustrated in FIGS. 1 to 3 with the chain guide in an extended position with respect to the base member.
Figure 5:
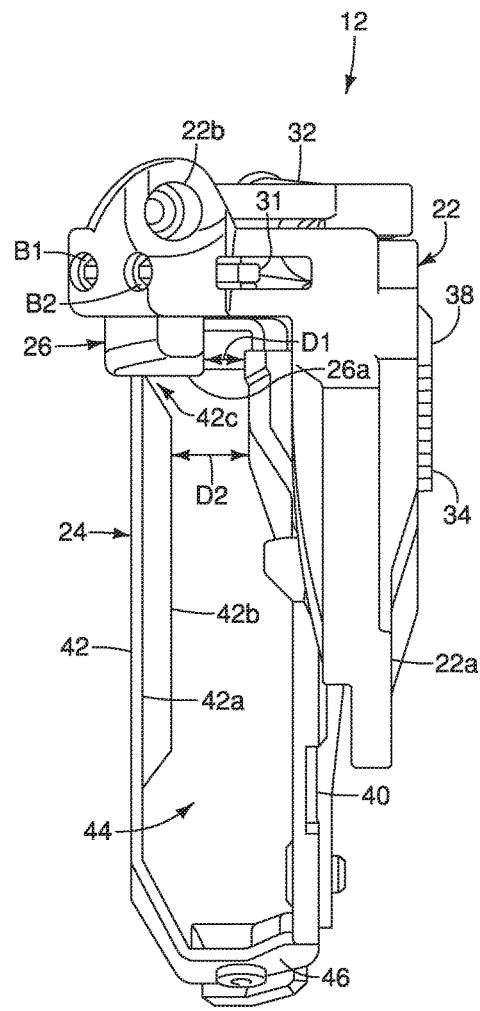
FIG. 5 is an enlarged front end elevational view of the bicycle front derailleur illustrated in FIGS. 1 to 4 with the chain guide in a retracted position with respect to the base member.
Figure 6:
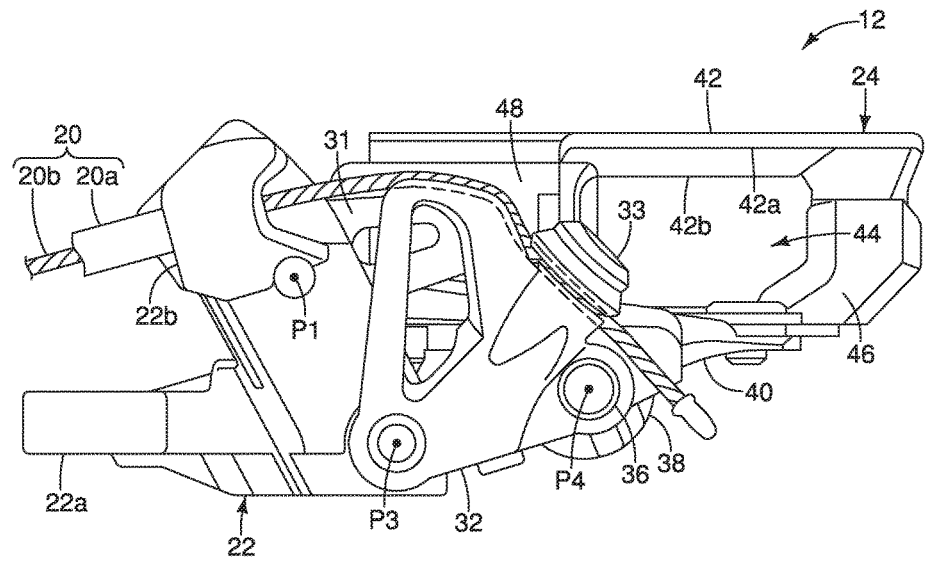
FIG. 6 is an enlarged top view of the bicycle front derailleur illustrated in FIGS. 1 to 5 with the chain guide in the extended position with respect to the base member.

Now, the chain guide 24 will be discussed in more detail. As shown in FIGS. 4 to 10, the chain guide 24 includes an inner guide plate 40 and an outer guide plate 42. The inner guide plate 40 and the outer guide plate 42 are configured to form a chain guiding slot 44 therebetween as seen in FIGS. 4 and 5. In the illustrated embodiment, the chain guide 24 further includes an upstream connecting part 46 and a downstream connecting part 48. The upstream connecting part 46 connects upstream ends of the inner and outer guide plates 40 and 42. The downstream connecting part 48 connects downstream ends of the inner and outer guide plates 40 and 42. The terms "upstream" and "downstream" as used herein mean with respect to a chain driving direction CD of the bicycle chain 18 inside the chain guiding slot 44 during a forward pedaling action being applied the first and second sprockets 14 and 16. In other words, the inner surfaces of the inner and outer guide plates 40 and 42 face each other to form the chain guiding slot 44 therebetween for receiving the bicycle chain 18.

More specifically, the chain guide 24 is moved relative to the base member 22 in an outward direction away from the bicycle frame 1 by pulling the inner cable 20b (i.e., a pulling operation) of the operation cable 20 in response to actuation of the shifter. Thus, in response to releasing operation of the operation cable 20, the outer guide plate 42 contacts and laterally shifts the bicycle chain 18 such that the bicycle chain 18 moves in an inward direction with respect to the bicycle frame 1 from the first sprocket 14 to the second sprocket 16. Also the chain guide 24 is moved relative to the base member 22 in an outward direction away from the bicycle frame 1 by pulling the inner cable 20b (i.e., a pulling operation) of the operation cable 20 in response to actuation of a shifter (not shown). In this way, the chain guide 24 can selectively position the bicycle chain 18 over one of the first and second sprockets 14 and 16 in response to the actuation of the shifter.

Figure 8:
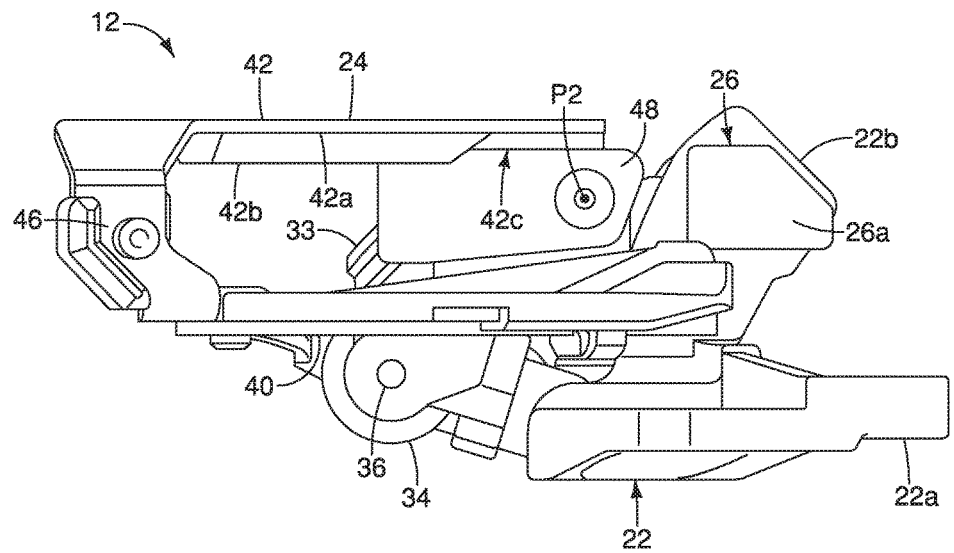
FIG. 8 is an enlarged bottom view of the bicycle front derailleur illustrated in FIGS. 1 to 7 with the chain guide in the extended position with respect to the base member.
Figure 9:
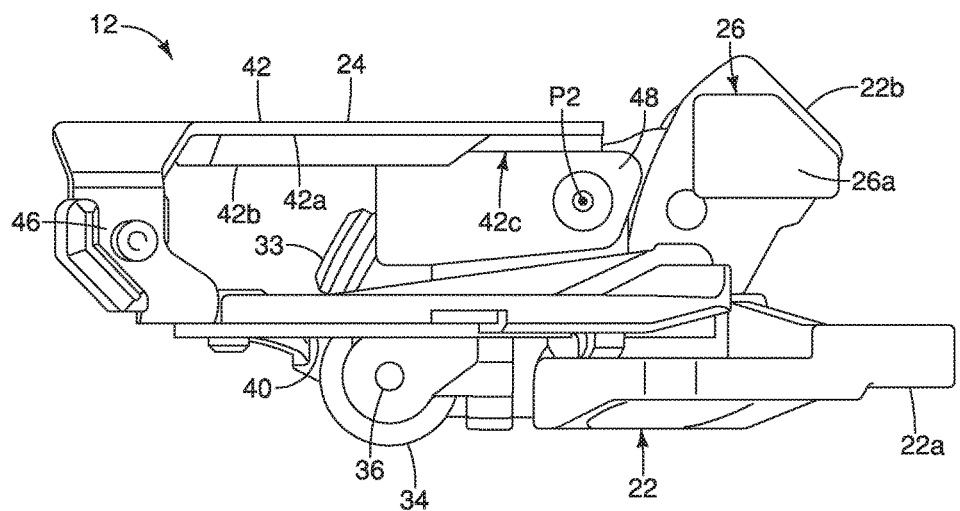
FIG. 9 is an enlarged bottom view of the bicycle front derailleur illustrated in FIGS. 1 to 8 with the chain guide in the retracted position with respect to the base member.
Figure 10:
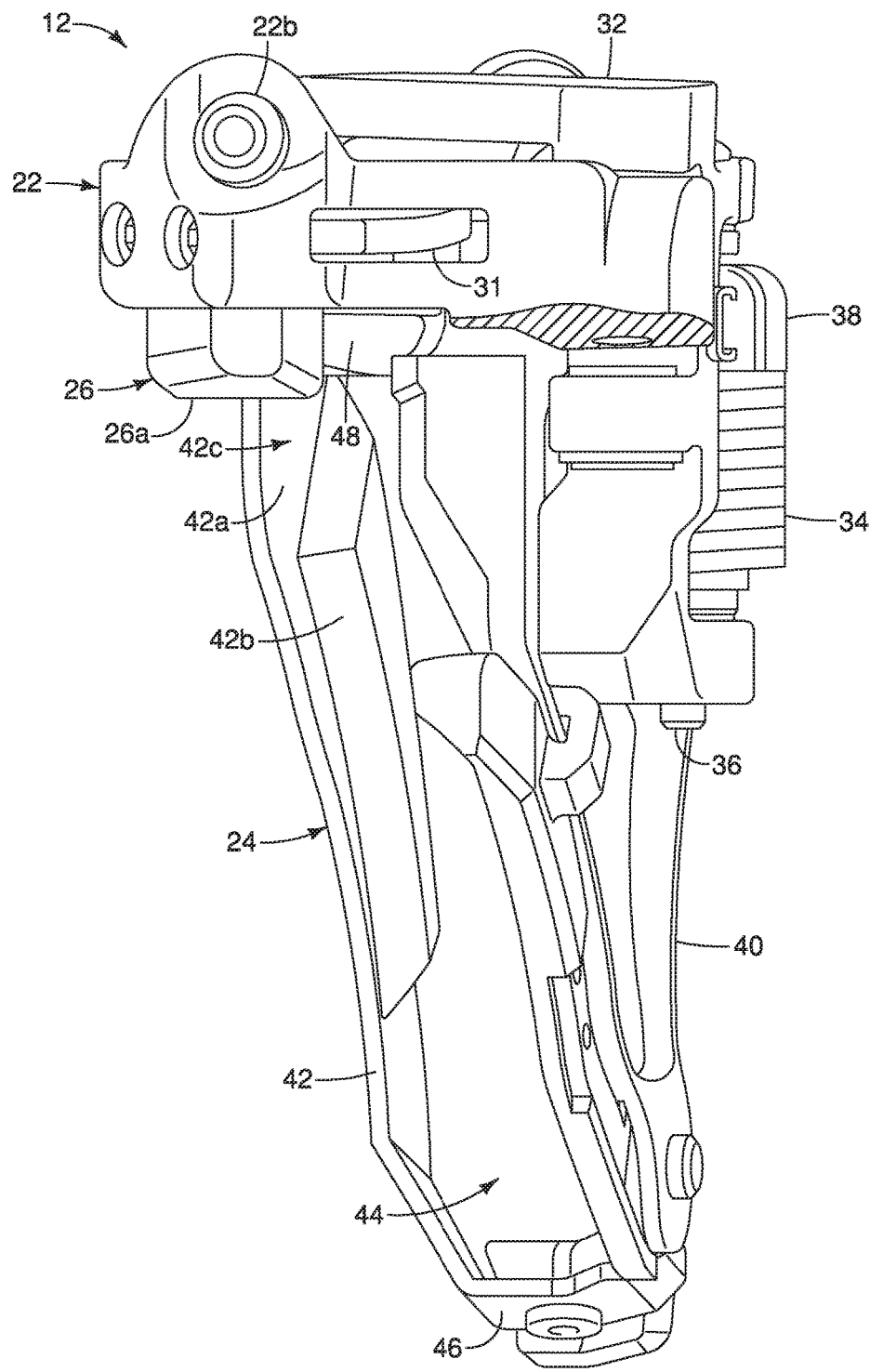
FIG. 10 is a perspective view of the bicycle front derailleur illustrated in FIGS. 1 to 9 with the chain guide in the extended position with respect to the base member and a portion of the base member broken away.

Referring to FIGS. 8 to 10, in the illustrated embodiment, the outer guide plate 42 includes a base plate portion 42a and a chain guiding portion 42b. The chain guiding portion 42b protrudes from the base plate portion 42a toward the inner guide plate 40. The chain restricting abutment 26 is disposed on a downstream side of the chain guiding portion 42b with respect to the chain driving direction CD. The chain guiding portion 42b is an arc-shaped projection which is positioned to contact the bicycle chain 18 when the chain guide 24 is moved from the extended position toward the retracted position to move the bicycle chain 18 from a larger front sprocket (i.e., the first sprocket 14) toward an adjacent smaller front sprocket (i.e., the second sprocket 16). In other words, the chain guiding portion 42b is configured to contact a side surface 18a of the bicycle chain 18 when the base member 22 is mounted on the bicycle frame 1 and the chain guide 24 moves from the extended position toward the retracted position. The chain restricting abutment 26 is positioned with respect to the inner guide plate 40 such that a first axial distance D1 is defined between the chain restricting abutment 26 and the inner guide plate 40, and a second axial distance D2 is defined between the chain guiding portion 42b and the inner guide plate 40. The first axial distance D1 can be defined as a shortest distance between the chain restricting abutment 26 and the inner guide plate 40 in the axial direction parallel to the rotational center axis A. The second axial distance D2 can be defined as a shortest distance between the chain guiding portion 42b and the inner guide plate 40 in the axial direction parallel to the rotational center axis A. The first axial distance D1 is smaller than the second axial distance D2 in a state where the chain guide 24 is in at least one of the retracted position and the extended position. Since the chain restricting abutment 26 is disposed on the base member 22, the first axial distance D1 changes based on the position of the chain guide 24. In the case of the extended position, the first axial distance D1 is zero. If the chain restricting abutment 26 is provided on the chain guide 24, the chain restricting abutment can be located such that the first axial distance D1 can be zero while the inner guide plate 40 in the both the extended and retracted positions as needed and/or desired. Further, the first axial distance D1 and the second axial distance D2 can be equal to each other in the state where the chain guide 24 is in at least one of the retracted position and the extended position, if needed and/or desired.

In the illustrated embodiment, the outer guide plate 42 is configured to define a non-contact space 42c between the chain restricting abutment 26 and the chain guiding portion 42b in the chain driving direction CD. The non-contact space 42c is configured not to contact the bicycle chain 18 when the base member 22 is mounted on the bicycle frame 1 and the chain guide 24 moves from the extended position toward the retracted position. Thus, the chain guiding portion 42b can be distant from the chain restricting abutment 26 in the chain driving direction CD via the non-contact space 42c It can reduce chain shifting force toward the second sprocket 16 to reduce friction between the bicycle chain 18 and the chain restricting abutment 26 during the downshifting operation.

Now, the chain restricting abutment 26 will be discussed in more detail. As shown in FIGS. 4 to 12, the chain restricting abutment 26 is disposed on the base member 22. In particular, the chain restricting abutment 26 is disposed at a front end of the base member 22. As used herein, the expression "front end" with respect to parts of a front derailleur refers to the end of the part that is location towards a front end of a bicycle that is equipped with the bicycle front derailleur. The chain restricting abutment 26 is disposed on a downwardly facing surface of the base member 22. As used herein, the expression "downwardly facing" should be interpreted relative to a bicycle in an upright riding position on a horizontal surface and that is equipped with the bicycle front derailleur.

The chain restricting abutment 26 includes a protrusion 26a. The protrusion 26a restricts radial outward movement of the bicycle chain 18 during a downshift such that the bicycle chain 18 only moves from the first sprocket 14 to the second sprocket 16 at designated downshift regions of the first sprocket 14 as explained below. The protrusion 26a is disposed between the inner guide plate 40 and the outer guide plate 42 as viewed from a direction perpendicular to the rotational center axis A when the base member 22 is mounted on the bicycle frame 1. In this position, the chain restricting abutment 26 is configured to restrict the bicycle chain 18 from moving in a radially outward direction of the rotational center axis A of a bicycle front sprocket when the base member 22 is mounted on the bicycle frame 1 and the chain guide 24 moves from the extended position toward the retracted position. In particular, the chain restricting abutment 26 is configured to contact an outer periphery 18b of the bicycle chain 18 when the base member 22 is mounted on the bicycle frame 1 and the bicycle chain 18 moves from a larger front sprocket (i.e., the first sprocket 14) toward an adjacent smaller front sprocket (i.e., the second sprocket 16). In this way, the bicycle chain 18 cannot be moved off of the first sprocket 14 except at designated downshift regions of the first sprocket 14 as explained below.

Figure 11:
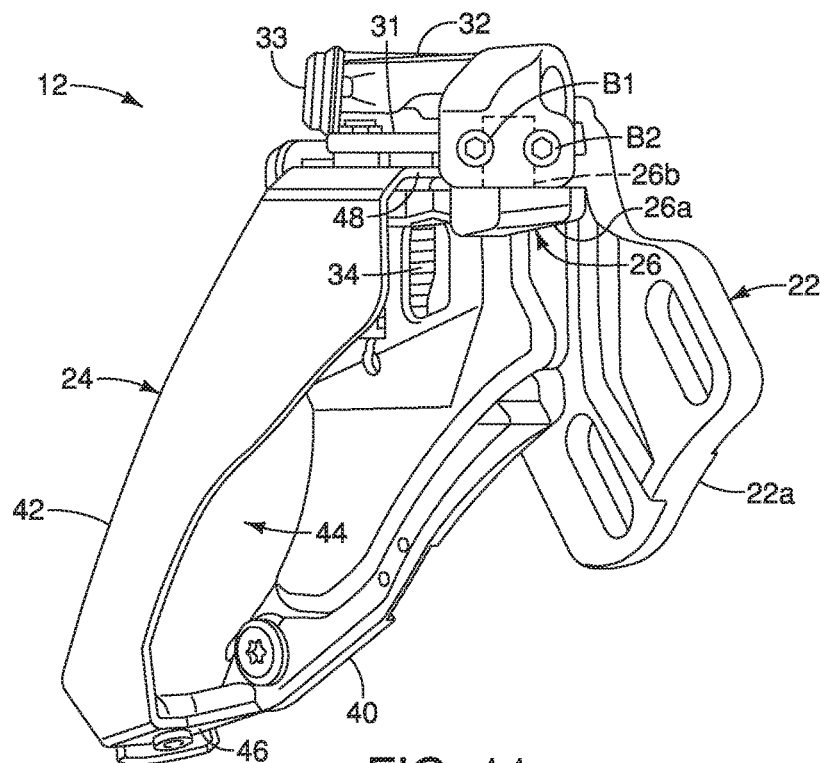
FIG. 11 is another perspective view of the bicycle front derailleur illustrated in FIGS. 1 to 10 with the chain guide in the extended position with respect to the base member and showing the attachment part of the chain restricting abutment in broken lines.
Figure 12:
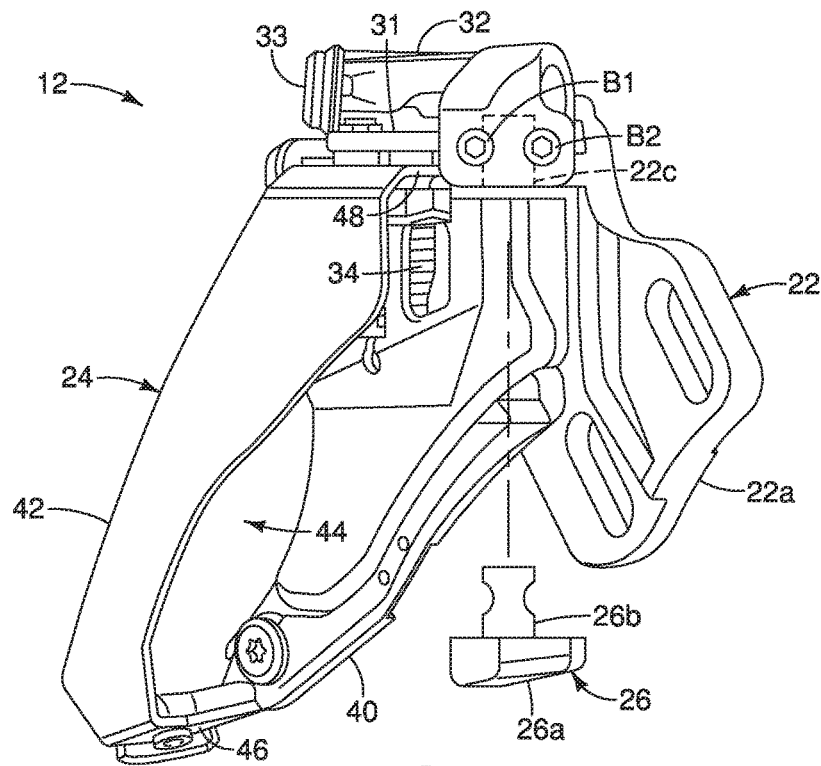
FIG. 12 is another perspective view, similar to FIG. 11, of the bicycle front derailleur illustrated in FIGS. 1 to 11 but with the chain restricting abutment exploded out from the base member.
Figure 13:
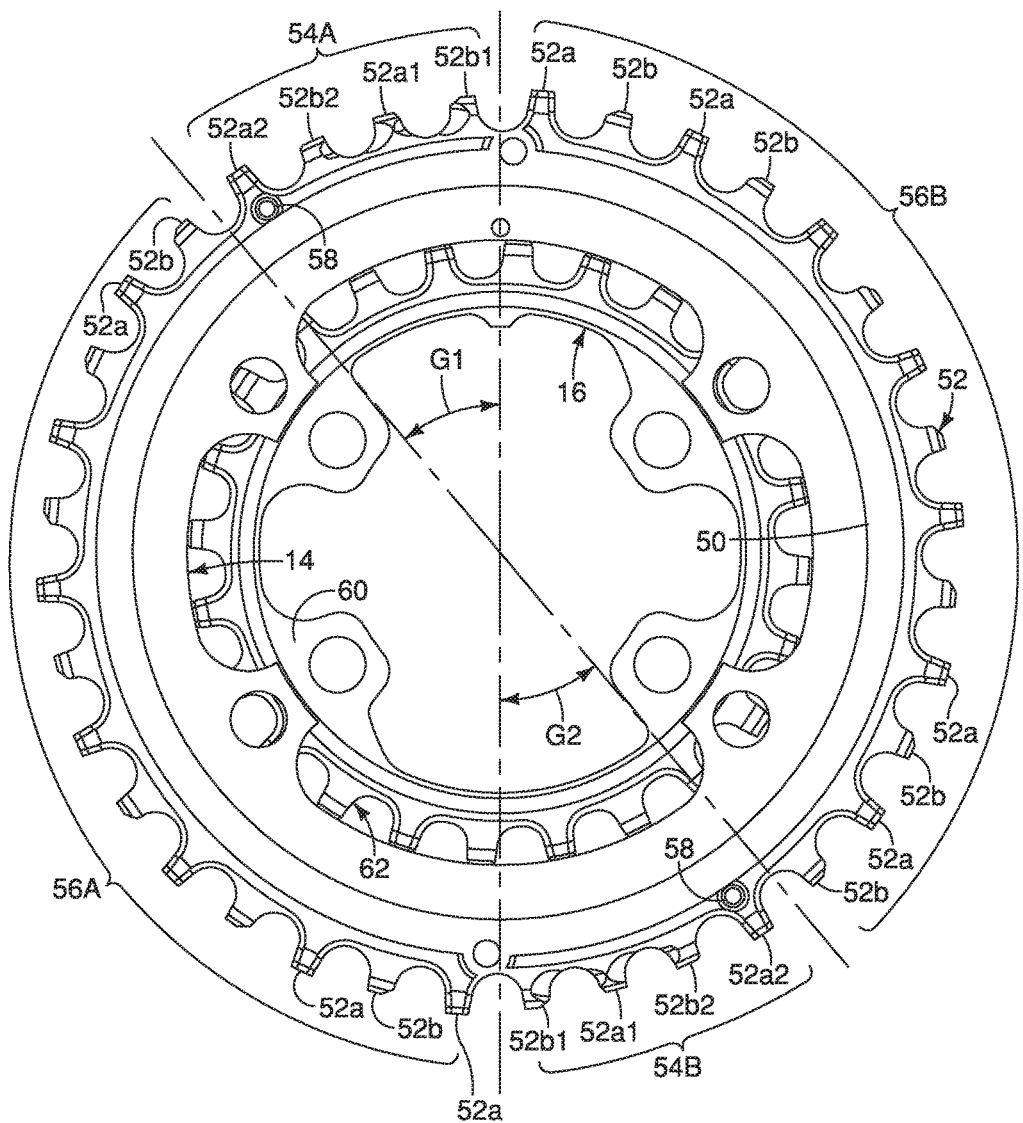
FIG. 13 is an outer side elevational view of a bicycle sprocket assembly used with the bicycle front derailleur illustrated in FIGS. 1 to 12.
Figure 14:
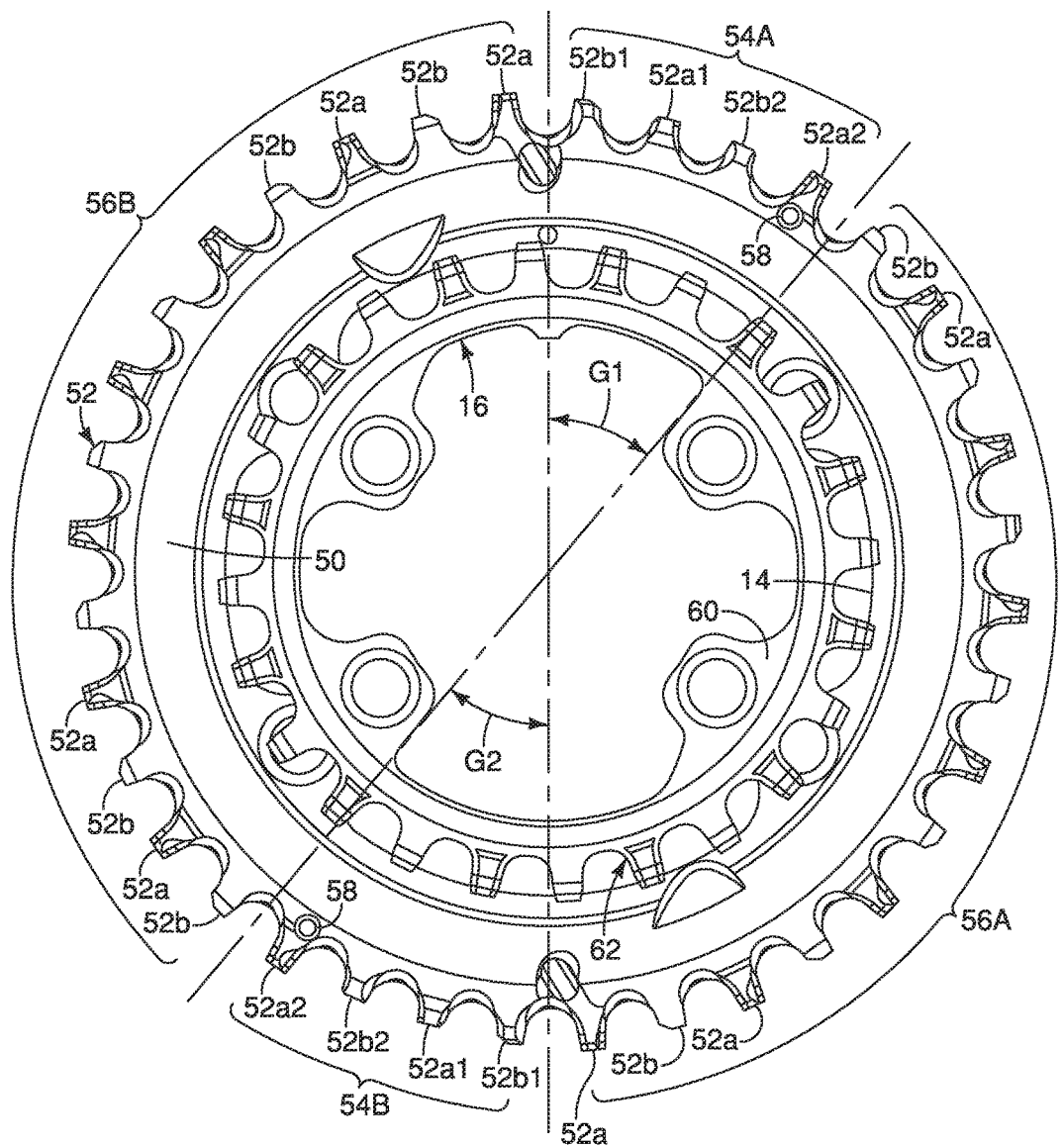
FIG. 14 is an inner side elevational view of the bicycle sprocket assembly illustrated in FIG. 13.
Figure 15:
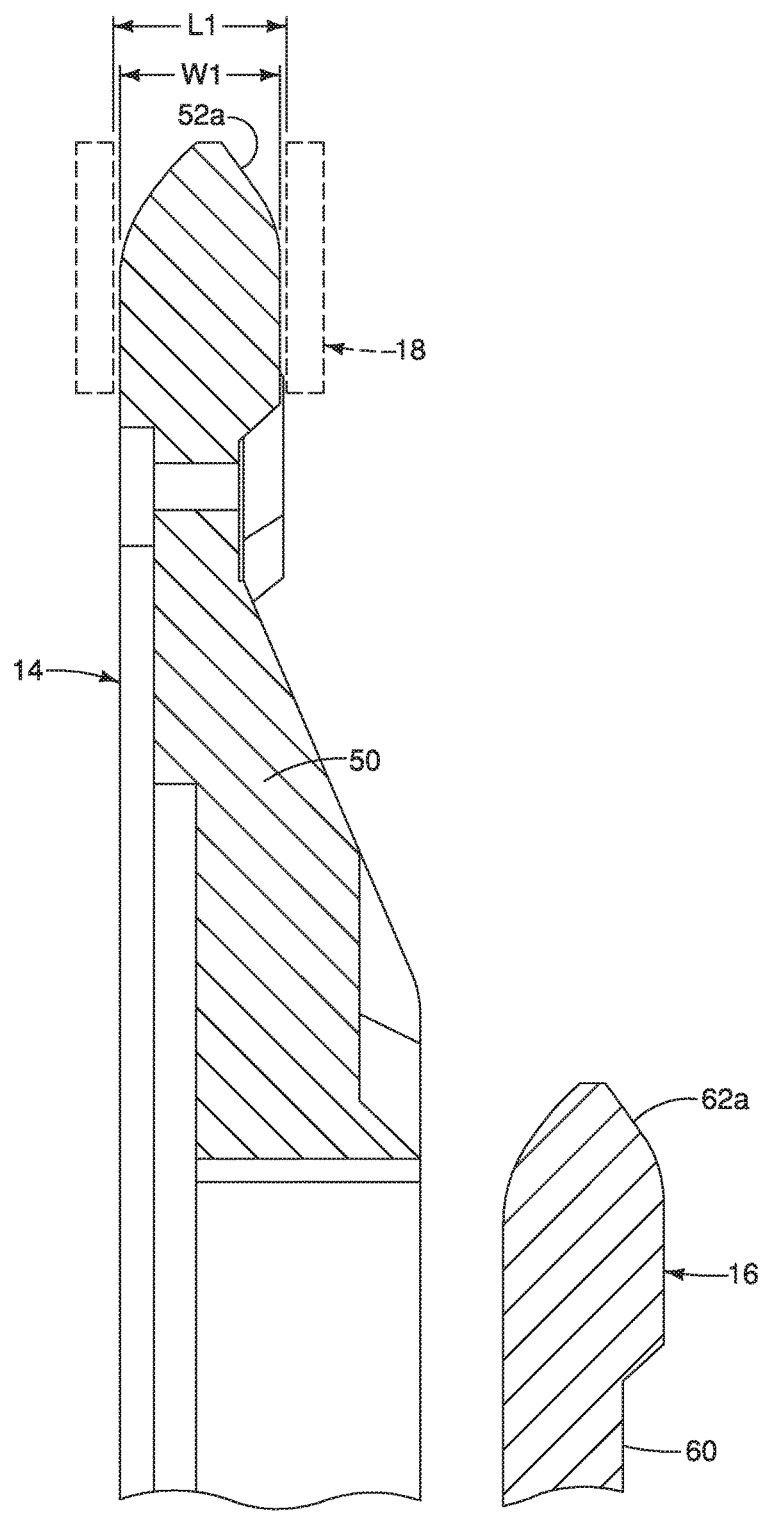
FIG. 15 is a partial cross sectional of the front sprockets of the bicycle sprocket assembly illustrated in FIGS. 13 and 14 as seen along a section line bisecting one of the driving teeth of the large front sprocket and bisecting one of the wide teeth of the small front sprocket.
Figure 16:
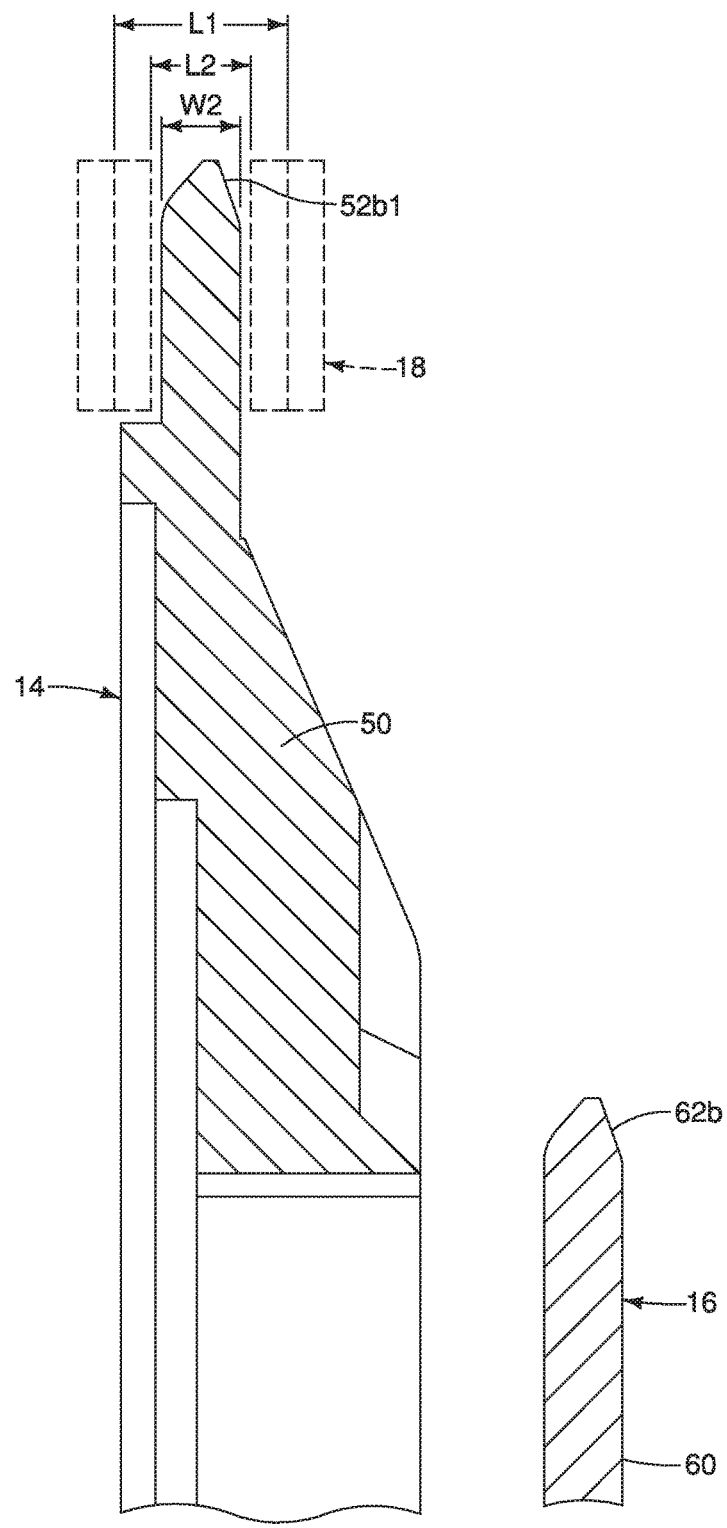
FIG. 16 is a partial cross sectional of the front sprockets of the bicycle sprocket assembly illustrated in FIGS. 13 and 14 as seen along a section line bisecting one of the downshift teeth of the large front sprocket and bisecting one of the thin teeth of the small front sprocket.

Preferably, as seen in FIGS. 11 and 12, the chain restricting abutment 26 is a separate member from the base member 22. The chain restricting abutment 26 can be fixedly attached to the base member 22 using a suitable fastening means such as a fastener, a bonding material, etc. More preferably, the chain restricting abutment 26 is replaceable such that the chain restricting abutment 26 can be detached and reattached. In the illustrated embodiment, the chain restricting abutment 26 includes an attachment part 26b that is located in a recess 22c of the base member 22 and fastened to the base member 22 by a pair of limit screws B1 and B2. The limit screws B1 and B2 are used to set the range of movement of the chain guide 24 to establish an extended most position and retracted most position of the chain guide 24. However, the chain restricting abutment 26 can be formed as one-piece member with the base member 22.

Referring now to FIGS. 13 to 19, the first and second sprockets 14 and 16 will now be discussed in further detail. The first sprocket 14 includes a first body portion 50 and a plurality of first teeth 52. The first teeth 52 are disposed on an outer periphery of the first body portion 50. The first teeth 52 includes at least one outer-link plate engaging tooth 52a and at least one inner-link plate engaging tooth 52b. The at least one outer-link plate engaging tooth 52a has a first chain engaging tooth width W1 for engaging with the outer links of the bicycle chain 18. The at least one inner-link plate engaging tooth 52b has a second chain engaging tooth width W2 for engaging with the inner link of the bicycle chain 18. Accordingly, the first chain engaging tooth width W1 is greater than the second chain engaging tooth width W2.

Figure 17:
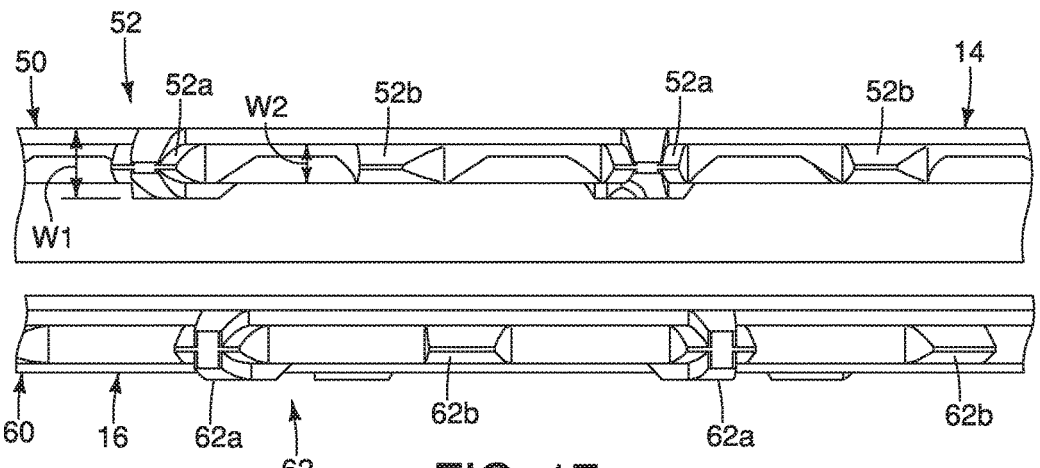
FIG. 17 is a partial edge view of the front sprockets of the bicycle sprocket assembly illustrated in FIGS. 13 and 14.
Figure 18:
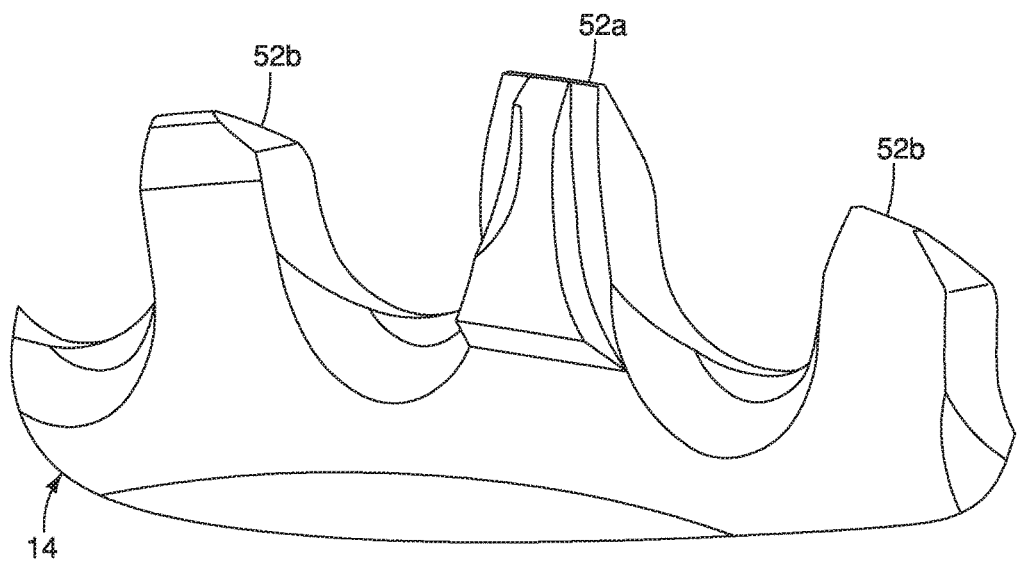
FIG. 18 is a partial perspective view of the large front sprocket of the bicycle sprocket assembly illustrated in FIGS. 13 and 14.

Preferably, the at least one outer-link plate engaging tooth 52a includes a plurality of the outer-link plate engaging teeth 52a with each of the outer-link plate engaging teeth 52a having the first chain engaging tooth width W1. The first chain engaging tooth width W1 are smaller than an outer link space L1 that is defined between an opposed pair of outer link plates of the bicycle chain 18. The first chain engaging tooth widths W1 are larger than an inner link space L2 that is defined between an opposed pair of inner link plates of the bicycle chain 18. The first chain engaging tooth widths W1 of the outer-link plate engaging teeth 52a are preferably in a range from 2.5 mm to 5.4 mm, and more preferably in a range from 3.0 mm to 4.5 mm. Likewise, preferably, the at least one inner-link plate engaging tooth 52b includes a plurality of the inner-link plate engaging teeth 52b with each of the inner-link plate engaging teeth 52b having the second chain engaging tooth width W2. The second chain engaging tooth widths W2 are smaller than the inner link space that is defined between an opposed pair of inner link plates of the bicycle chain 18. The second chain engaging tooth widths W2 of the inner-link plate engaging teeth 52b are preferably in a range from 1.5 mm to 2.3 mm. The outer-link plate engaging teeth 52a and the inner-link plate engaging teeth 52b are alternatingly disposed in a circumferential direction. The outer-link plate engaging teeth 52a are preferably formed into a "+" (plus) shape as seen from the radially outer side, as shown in FIG. 17. On the other hand, the inner-link plate engaging teeth 52b are preferably formed into a "−" (minus) shape as seen from the radially outer side, as shown in FIG. 17.

Figure 19:
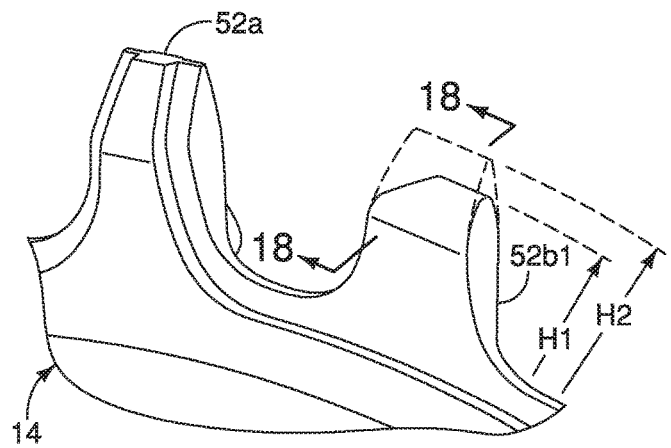
FIG. 19 is a partial perspective view of the large front sprocket of the bicycle sprocket assembly illustrated in FIGS. 13 and 14.

The first teeth 52 of the first sprocket 14 include at least one downshift tooth and at least one driving tooth (see FIG. 19). The at least one downshift tooth is disposed at the designated downshift region. The at least one downshift tooth (i.e. a downshift derailing tooth 52b2 described below) has a first radial tooth height H1. The at least one driving tooth has a second radial tooth height H2 that is larger than the first radial tooth height H1. The bicycle chain 18 can more easily move off the first sprocket 14 and onto the second sprocket 16 at the downshift tooth than at the driving tooth, because the radial tooth height of the downshift tooth is smaller than the radial tooth height of the driving tooth. Also, when the front derailleur 12 and the first sprocket 14 are used together, the chain restricting abutment 26 cooperates with the first teeth 52 of the first sprocket 14 so that the bicycle chain 18 reliably moves off of the downshift tooth and not off of the driving tooth.

More preferably, the first teeth 52 of the first sprocket 14 include a set of first downshift teeth 54A, a set of second downshift teeth 54B, a set of first driving teeth 56A and a set of second driving teeth 56B. The first driving teeth 56A are disposed between the first and second downshift teeth 54A and 54B on an upstream side of the first downshift teeth 54A with respect to a chain driving direction CD. The second driving teeth 56B are disposed between the first and second downshift teeth 54A and 54B on a downstream side of the first downshift teeth 54A with respect to the chain driving direction CD.

The first downshift teeth 54A are configured to define a first predetermined shift gate G1 in which the bicycle chain 18 shifts towards the second sprocket 16 to move from the first sprocket 14 to the second sprocket 16. The second downshift teeth 54B are configured to define a second predetermined shift gate G2 in which the bicycle chain 18 shifts towards the second sprocket 16 to move from the first sprocket 14 to the second sprocket 16. Here, each of the first and second predetermined shift gates G1 and G2 includes one downshift derailing tooth 52b2 having the first radial tooth height H1, two downshift facilitation teeth 52b1, 52a1 having the second radial tooth height H2 and one projection holding tooth 52a2 that holds a downshift facilitation projection 58 projecting from the first bicycle sprocket 14 toward the second bicycle sprocket 16 in the axial direction. The downshift derailing tooth 52b2 is a tooth to first derail the bicycle chain 18 from the first bicycle sprocket 14 during the downshifting operation. Each of the two downshift facilitation teeth 52b1 and 52a1 has a chamfer to facilitate the downshifting operation of the bicycle chain 18 on an outer side with respect to the axial direction. More specifically, the chamfer of the two downshift facilitation teeth 52b1 and 52a1 facilitates the bicycle chain 18 to be slanted toward the second sprocket 16 during the downshifting operation. The two downshift facilitation teeth 52b1 and 52a1 have the second radial tooth height H2, however the two downshift facilitation teeth 52b1 and 52a1 can have a radial tooth height shorter than the second radial tooth height H2. The downshift facilitation projection 58 is configured to be engaged with the bicycle chain 18 to facilitate downshifting operation after the bicycle chain 18 is disengaged from the downshift teeth 52a by the chain guide 24 that moves from the extended position toward the retracted position. The downshift facilitation projection 58 can be omitted if needed and/or desired. Preferably, as shown, the first and second driving teeth 56A and 56B all have the first radial tooth height H1 so that the chain 18 cannot be shifted off of the first sprocket 16 by the chain guide 24, except at the first and second predetermined shift gates G1 and G2.

Figure 20:
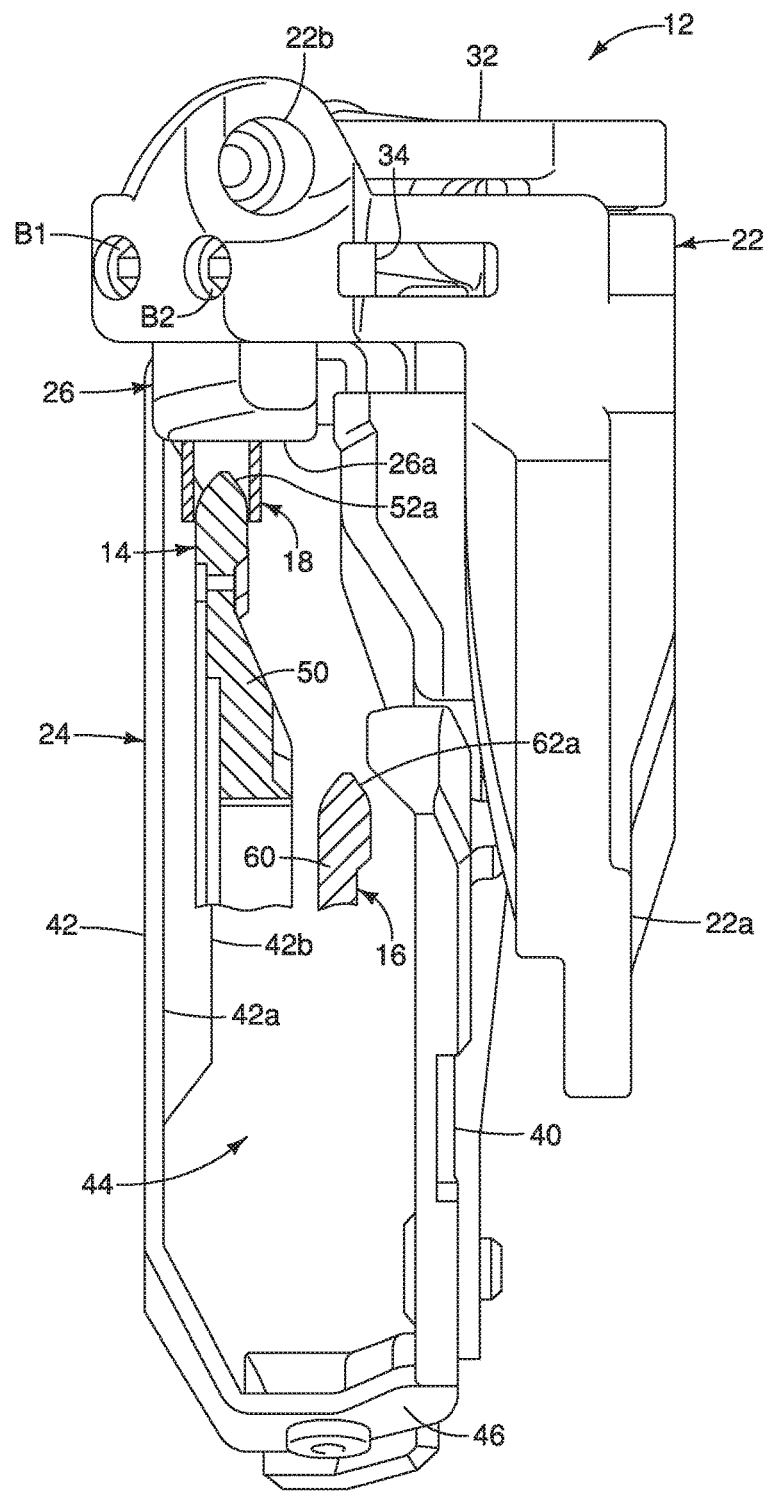
FIG. 20 is an enlarged front end elevational view of the bicycle front derailleur illustrated in FIGS. 1 to 12 being downshifted with the chain engaged with the driving teeth of the large front sprocket in the area beneath the chain restricting abutment such that the chain contacts the chain restricting abutment to prevent the chain from moving onto the small front sprocket.
Figure 21:
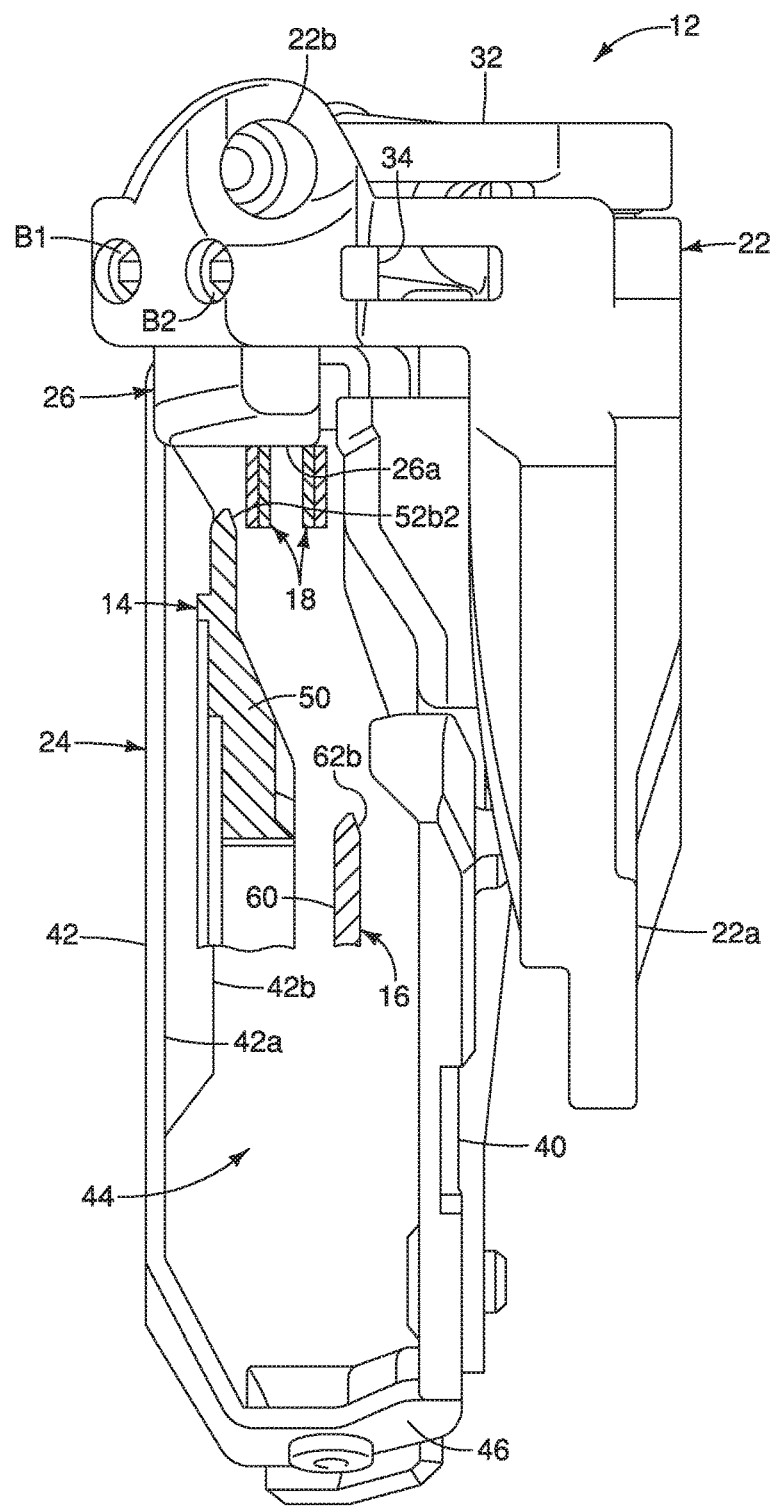
FIG. 21 is an enlarged front end elevational view of the bicycle front derailleur illustrated in FIGS. 1 to 12 being downshifted with the chain engaged with the downshift teeth of the large front sprocket in the area beneath the chain restricting abutment such that the chain passes between the chain restricting abutment and the downshift teeth to permit the chain to move onto the small front sprocket.

In this way, as shown in FIG. 20, a bottom surface of the protrusion 26a of the chain restricting abutment 26 contacts the outer periphery 18b of the bicycle chain 18 as the bicycle chain 18 moves from a larger front sprocket (i.e., the first sprocket 14) toward an adjacent smaller front sprocket (i.e., the second sprocket 16) so as to prevent the bicycle chain 18 from moving off the first sprocket 14, except at the first and second predetermined shift gates G1 and G2. This is because a gap between the bottom surface of the protrusion 26a and the radial tooth top of first and second driving teeth 56A and 56B is too narrow for the bicycle chain 18 to be disengaged (derailed) from the first bicycle sprocket 14 via the gap. On the other hand, as shown in FIG. 21, when the bicycle chain 18 is disposed between the chain restricting abutment and one of the first and second predetermined shift gates G1 and G2 during the downshifting operation, a gap between the bottom surface 26a of the chain restricting abutment 26 and the radial tooth top of the downshift derailing tooth 52b2 becomes greater than the gap between the bottom surface 26a and the radial tooth top of first and second driving teeth 56A and 56B. Thereby the bicycle chain can be disengaged (derailed) from the first bicycle sprocket 14 at the first and second predetermined shift gates G1 and G2.

As seen in FIGS. 13 to 19, the second sprocket 16 includes a second body portion 60 and a plurality of second teeth 62. The second teeth 62 are disposed on an outer periphery of the second body portion 60. The second sprocket 16 has a fewer total number of the second teeth 62 than a total number of the first teeth 52 of the first sprocket 14. The second teeth 62 include a plurality of outer-link plate engaging teeth 62a and a plurality of inner-link plate engaging teeth 62b. The outer-link plate engaging teeth 62a and the inner-link plate engaging teeth 62b are alternatingly disposed in a circumferential direction. The outer-link plate engaging teeth 62a are preferably formed into a "+" (plus) shape as seen from the radially outer side. On the other hand, the inner-link plate engaging teeth 62b are preferably formed into a "–" (minus) shape as seen from the radially outer side. Accordingly, an axial width of the outer-link plate engaging teeth 62a is greater than the axial width of the inner-link plate engaging teeth 62b. In the illustrated embodiment, the second teeth 62 have teeth configurations substantially identical to the teeth configurations of the sprockets disclosed in U.S. Pat. No. 9,086,138, which is assigned to Shimano Inc. However, the teeth configurations of the second sprocket 16 are not limited to the illustrated teeth configurations. Since the teeth configurations of the second sprocket 16 can be conventional or any available teeth configurations, the second sprocket 16 will not be discussed in further detail herein.

Second Embodiment

Figure 22:
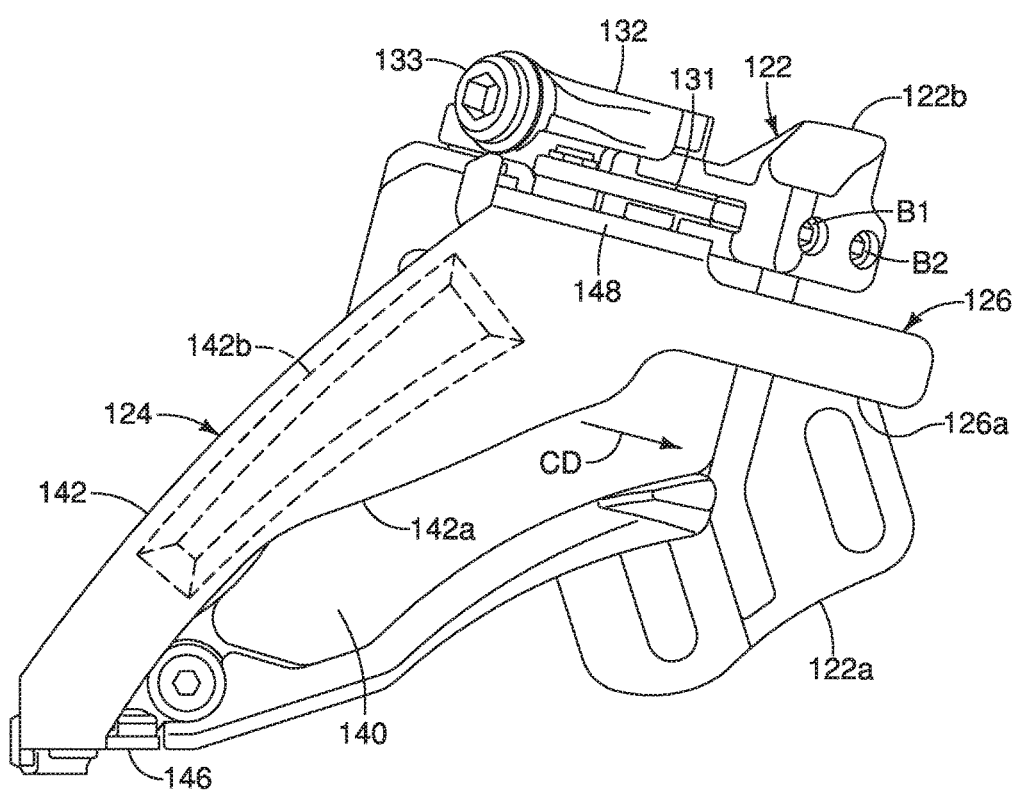
FIG. 22 is an enlarged outer side elevational view of a bicycle front derailleur having a base member configured to be mounted to the bicycle frame illustrated in FIG. 1 and a chain guide for shifting a bicycle chain between adjacent front sprockets in accordance with a second illustrated embodiment.
Figure 23:
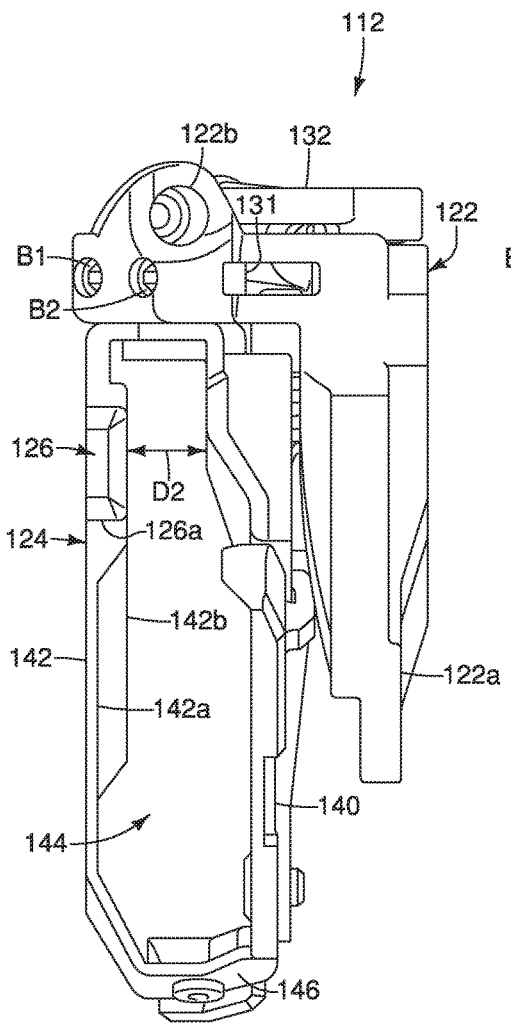
FIG. 23 is an enlarged front end elevational view of the bicycle front derailleur illustrated in FIG. 21 with its chain guide in an extended position with respect to the base member.
Figure 24:
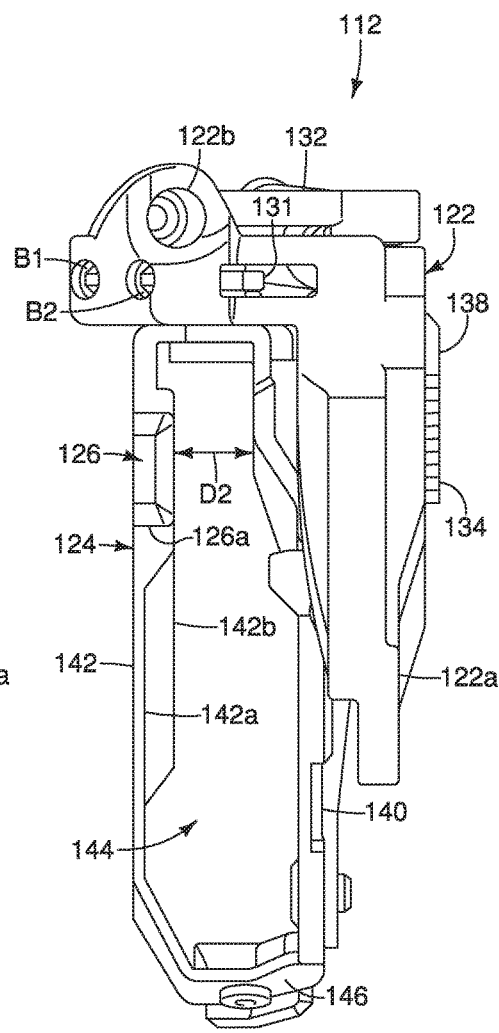
FIG. 24 is an enlarged front end elevational view of the bicycle front derailleur illustrated in FIGS. 21 and 22 with its chain guide in a retracted position with respect to the base member.

Referring now to FIGS. 22 to 24, a bicycle front derailleur 112 is illustrated in accordance with a second embodiment. The bicycle front derailleur 112 is configured to be mounted to the bicycle frame illustrated in FIG. 1 for laterally shifting the bicycle chain 18 between the first and second sprockets 14 and 16. Here, the front derailleur 112 is a cable operated front derailleur that is operatively connected to a shifter (not shown) using an operation cable 20. The front derailleur 112 basically comprises a base member 122, a chain guide 124 and a chain restricting abutment 126. The front derailleur 112 further comprises a first link member 131 and a second link member 132 that interconnect the base member 122 and the chain guide 124 together for lateral movement with respect to the bicycle frame 1. Basically, the front derailleur 112 is identical to the front derailleur 12, as discussed above, except that the chain restricting abutment 126 is disposed on the chain guide 124 instead of being disposed on the base member 122. In view of the similarities between the front derailleurs 12 and 112, only the differences of the front derailleur 112 from the front derailleur 12 will be discussed herein for the sake of brevity.

Similar to the first embodiment, the chain restricting abutment 126 is configured to contact an outer periphery 18b of the bicycle chain 18 when the base member 122 is mounted on the bicycle frame 1 (similar to as seen in FIG. 1) and the bicycle chain 18 moves from a larger front sprocket (i.e., the first sprocket 14) toward an adjacent smaller front sprocket (i.e., the second sprocket 16).

The chain guide 124 includes an inner guide plate 140 and an outer guide plate 142. Here, the chain restricting abutment 126 is disposed on the outer guide plate 142 of the chain guide 124. The chain restricting abutment 126 is disposed forward of the inner guide plate 140. In other words, the chain restricting abutment 126 is disposed at a front end of the outer guide plate 42. In the second embodiment, the chain restricting abutment 126 is integrally formed as a one-piece member of the outer guide plate 142. However, the chain restricting abutment 126 can be separate member from the outer guide plate 142 that is attached to the outer guide plate 142.

The outer guide plate 142 includes a base plate portion 142a and a chain guiding portion 142b. The chain guiding portion 142b protrudes from the base plate portion 142a toward the inner guide plate 140. The chain guiding portion 142b is configured to contact a side surface of the bicycle chain 18 when the base member 122 is mounted on the bicycle frame 1 and the chain guide 124 moves from the extended position toward the retracted position. The chain restricting abutment 26 is aligned with the chain guiding portion 142b in a direction extending parallel to the chain driving direction CD. In this way, a bottom surface of the protrusion 126a of the chain restricting abutment 126 contacts the outer periphery 18b of the bicycle chain 18 as the bicycle chain 18 moves from a larger front sprocket (i.e., the first sprocket 14) toward an adjacent smaller front sprocket (i.e., the second sprocket 16) so as to prevent the bicycle chain 18 from moving off the first sprocket 14, except at the first and second predetermined shift gates G1 and G2.

Third Embodiment

Figure 25:
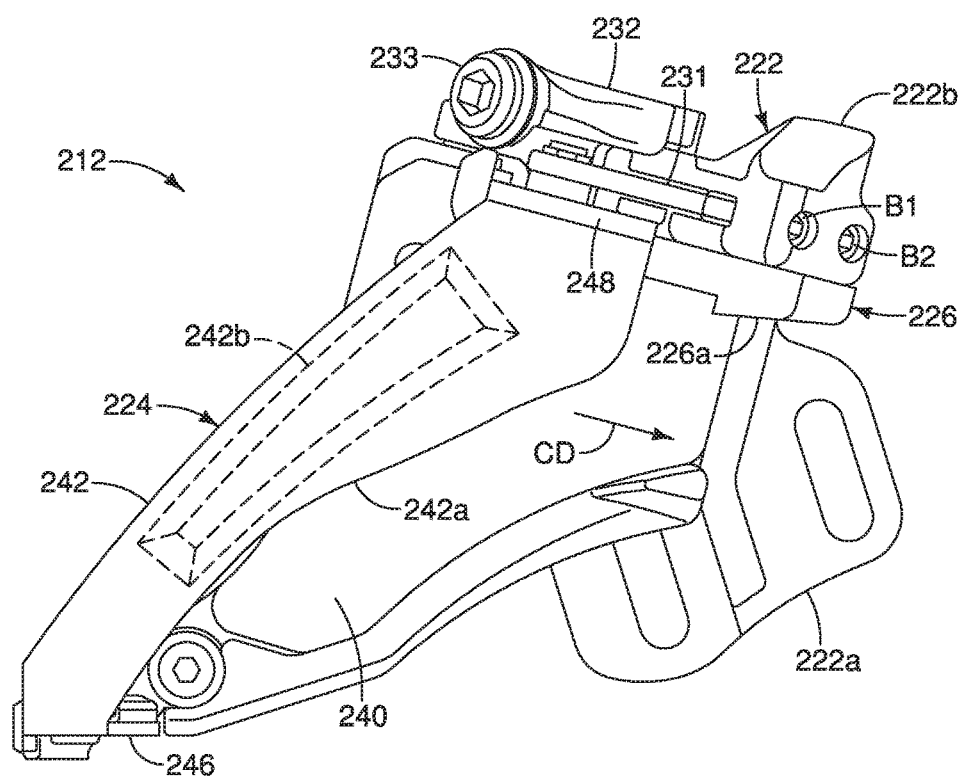
FIG. 25 is an enlarged outer side elevational view of a bicycle front derailleur having a base member configured to be mounted to the bicycle frame illustrated in FIG. 1 and a chain guide for shifting a bicycle chain between adjacent front sprockets in accordance with a third illustrated embodiment.
Figure 28:
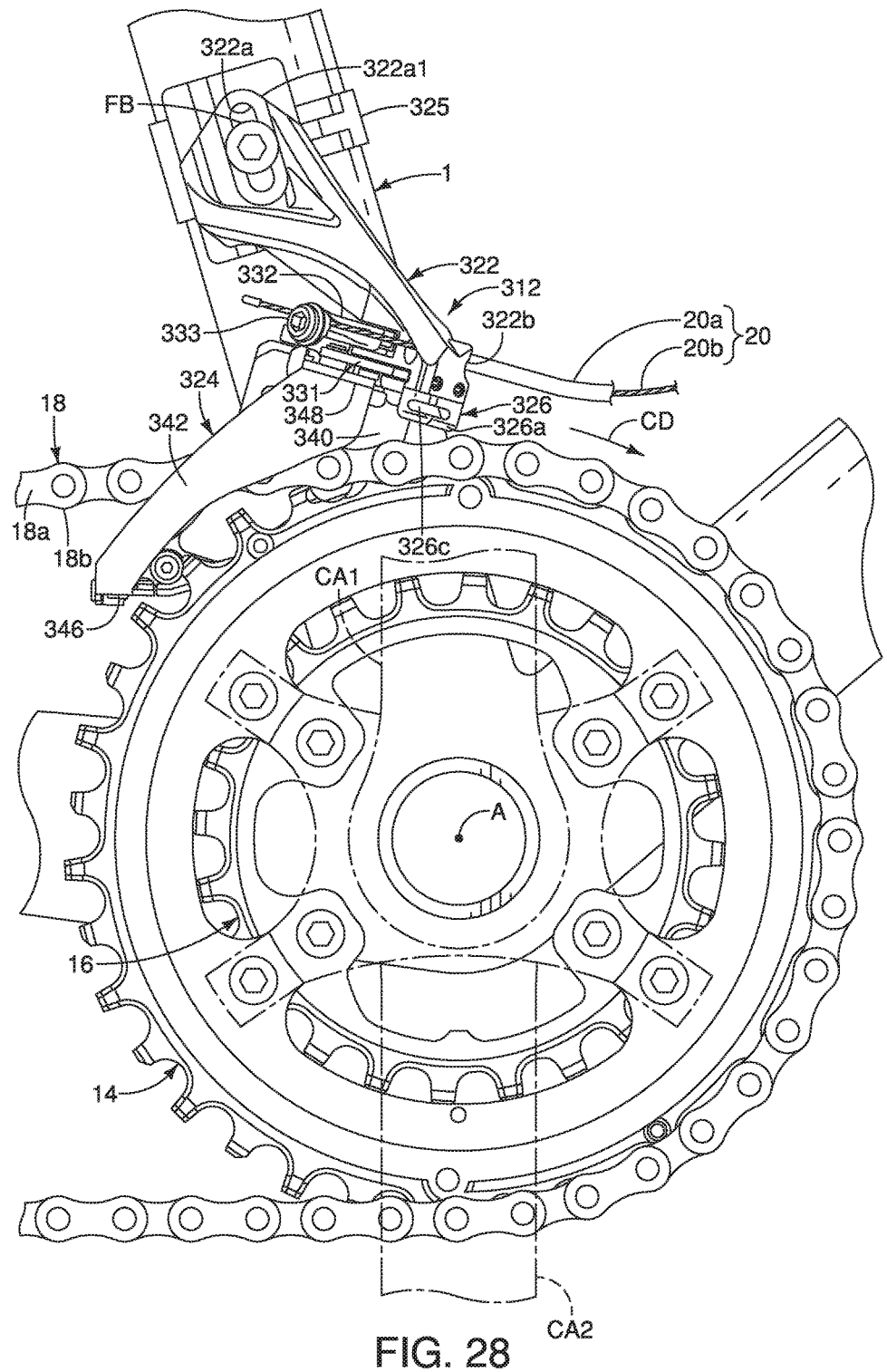
FIG. 28 is a partial side elevational view of a bicycle frame with a bicycle drive train assembly that includes a bicycle front derailleur, a first sprocket and a second sprocket with the bicycle front derailleur having a base member mounted to the bicycle frame for shifting a bicycle chain between the first and second sprockets in accordance with a fourth illustrated embodiment.

Referring now to FIGS. 25 to 27, a bicycle front derailleur 212 is illustrated in accordance with a third embodiment. The bicycle front derailleur 212 is configured to be mounted to the bicycle frame illustrated in FIG. 1 for laterally shifting the bicycle chain 18 between the first and second sprockets 14 and 16. Here, the front derailleur 212 is a cable operated front derailleur that is operatively connected to a shifter (not shown) using an operation cable 20. The front derailleur 212 basically comprises a base member 222, a chain guide 224 and a chain restricting abutment 226. The front derailleur 212 further comprises a first link member 231 and a second link member 232 that interconnect the base member 222 and the chain guide 224 together for lateral movement with respect to the bicycle frame 1. Basically, the front derailleur 212 is identical to the front derailleur 12, as discussed above, except that the chain restricting abutment 226 is disposed on the chain guide 224 instead of being disposed on the base member 222. In view of the similarities between the front derailleurs 12 and 212, only the differences of the front derailleur 212 from the front derailleur 12 will be discussed herein for the sake of brevity.

Similar to the first embodiment, the chain restricting abutment 226 is configured to contact an outer periphery 18b of the bicycle chain 18 when the base member 222 is mounted on the bicycle frame 1 (similar to as seen in FIG. 1) and the bicycle chain 18 moves from a larger front sprocket (i.e., the first sprocket 14) toward an adjacent smaller front sprocket (i.e., the second sprocket 16).

The chain guide 224 includes an inner guide plate 240, an outer guide plate 242 and a connecting part 248. The connecting part 248 extends between the inner guide plate 240 and the outer guide plate 242. The chain restricting abutment 226 is disposed on the connecting part of the chain guide 224. The chain restricting abutment 226 is disposed at a front end of the chain guide 224. The chain restricting abutment 226 includes a protrusion 226a protruding from the connecting part 248 between the inner guide plate 240 and the outer guide plate 242. In this way, a bottom surface of the protrusion 226a contacts the outer periphery 18b of the bicycle chain 18 as the bicycle chain 18 moves from a larger front sprocket (i.e., the first sprocket 14) toward an adjacent smaller front sprocket (i.e., the second sprocket 16) so as to prevent the bicycle chain 18 from moving off the first sprocket 14, except at the first and second predetermined shift gates G1 and G2. The chain restricting abutment 226 can be either detachable mounted to the connecting part 248, or integrally formed as a one-piece member of the connecting part 248 as needed and/or desired.

Fourth Embodiment

Referring now to FIGS. 28 to 34, a bicycle front derailleur 312 is illustrated in accordance with a fourth embodiment. The bicycle front derailleur 312 is configured to be mounted to the bicycle frame 1 illustrated in FIG. 28 for laterally shifting the bicycle chain 18 between the first and second sprockets 14 and 16. In particular, the front derailleur 312 is a cable operated front derailleur that is operatively connected to a shifter (not shown) using the operation cable 20 in the same manner as in the first embodiment, as discussed above. Thus, the bicycle front derailleur 312 is used with the bicycle frame 1 and the first and second sprockets 14 and 16, as discussed above.

Figure 29:
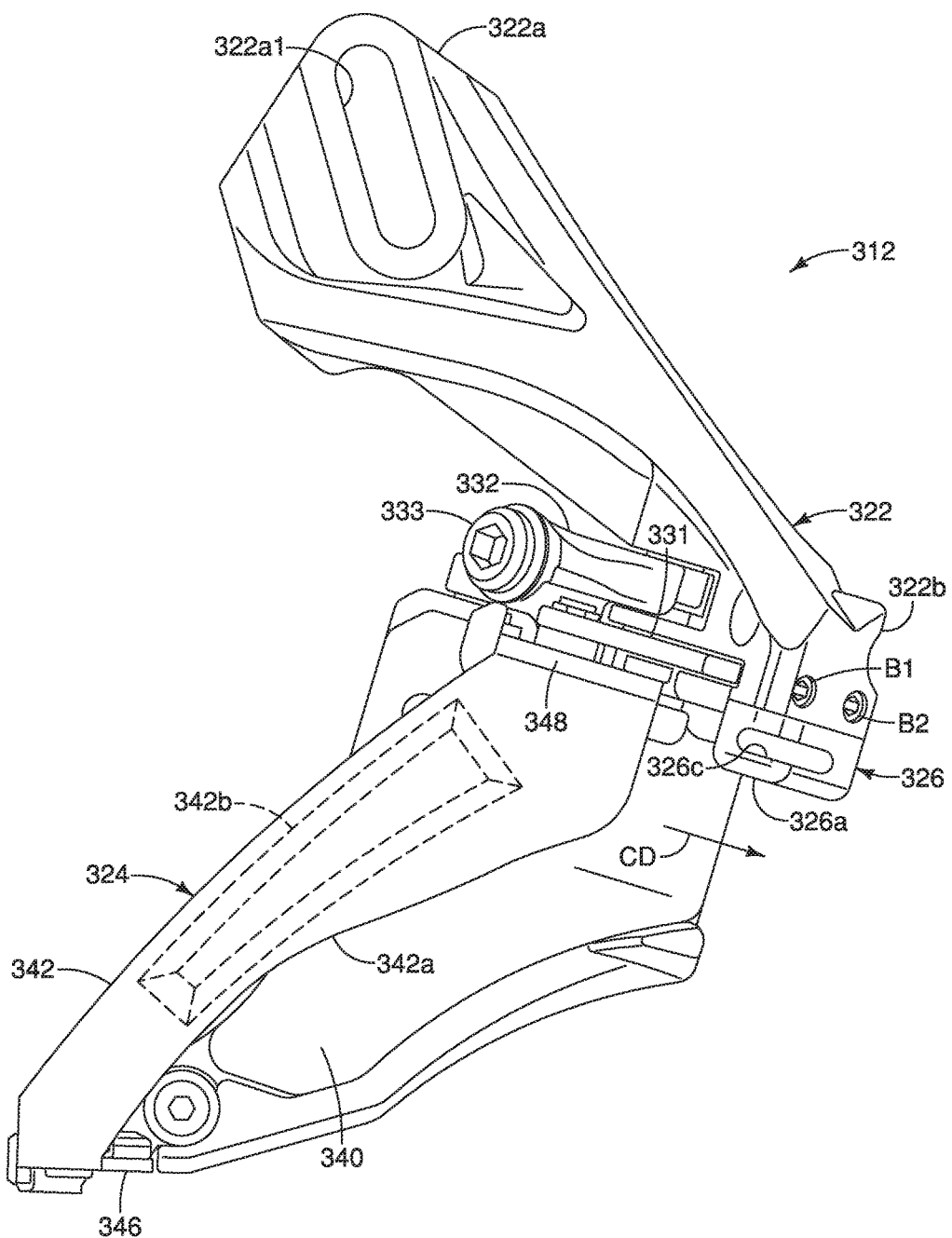
FIG. 29 is an enlarged outer side elevational view of the bicycle front derailleur illustrated in FIG. 28.
Figure 30:
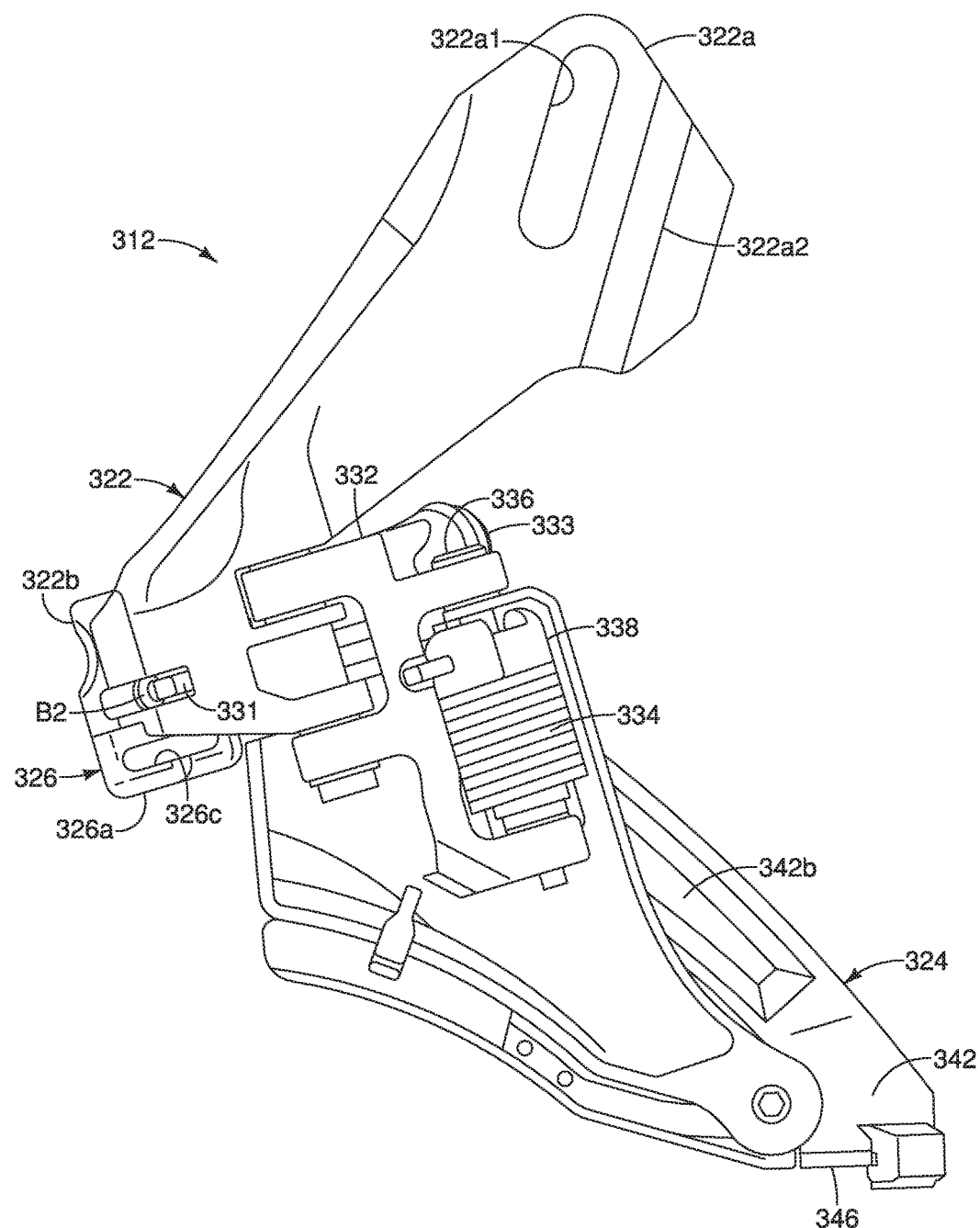
FIG. 30 is an enlarged inner side elevational view of the bicycle front derailleur illustrated in FIGS. 28 and 29.
Figure 31:
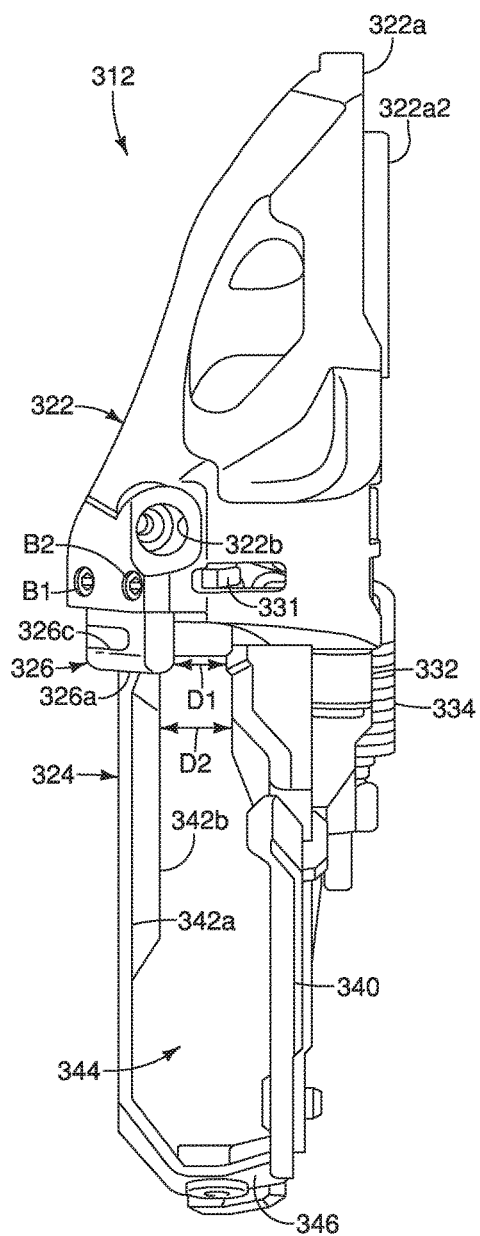
FIG. 31 is an enlarged front end elevational view of the bicycle front derailleur illustrated in FIGS. 28 to 30 with the chain guide in a retracted position with respect to the base member.
Figure 32:
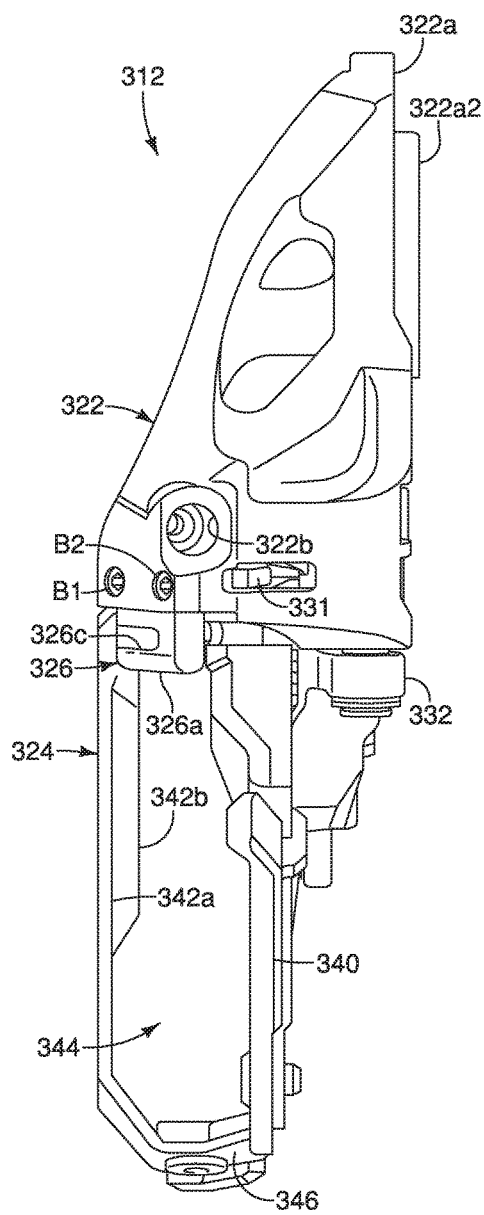
FIG. 32 is an enlarged front end elevational view of the bicycle front derailleur illustrated in FIGS. 28 to 30 with the chain guide in an extended position with respect to the base member.
Figure 33:
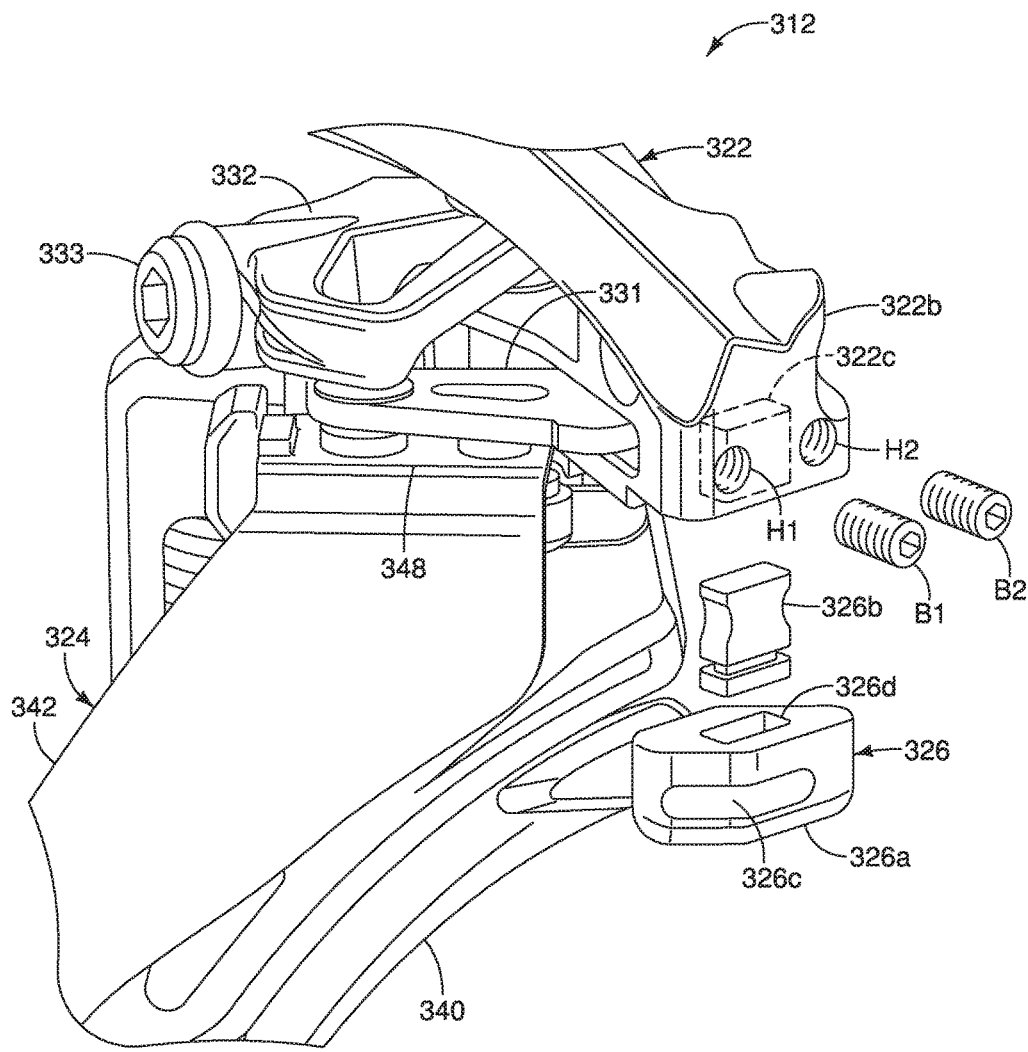
FIG. 33 is a partial perspective view of the bicycle front derailleur illustrated in FIGS. 28 to 32 but with the chain restricting abutment exploded out from the base member.

Referring to FIGS. 29 to 32, the front derailleur 312 basically comprises a base member 322 and a chain guide 324. The base member 322 is configured to be mounted to the bicycle frame 1 by a seat tube clamp 325, which is a conventional hanged tube clamp. The chain guide 324 is movably mounted to the base member 322 to move from a retracted position (FIG. 31) to an extended position (FIG. 32). Similar to the first embodiment, the front derailleur 312 further comprises a chain restricting abutment 326 that is mounted to the base member 322. The chain restricting abutment 326 is configured and arranged with respect to the base member 322 such that the chain 18 contacts the chain restricting abutment 326 to restrict the bicycle chain 18 from moving in a radially outward direction of a rotational center axis of a bicycle front sprocket when the base member 322 is mounted on the bicycle frame 1 and the chain guide 18 moves from the extended position (FIG. 32) toward the retracted position (FIG. 31). Thus, the chain restricting abutment 326 is disposed on a downstream side of the chain guide 324 with respect to the chain driving direction CD.

As seen in FIGS. 29 and 30, the front derailleur 312 further comprises a first link member 331 and a second link member 332 that interconnect the base member 322 and the chain guide 324 together for lateral movement with respect to the bicycle frame 1. A cable attachment bolt 333 is screwed into a threaded bore of the second link member 332 for fixedly attaching the inner cable 20b to the second link member 332. The interconnection of the first and second link members 331 and 332 between the base member 322 and the chain guide 324 is the same manner as the first embodiment. Also, similar to the first embodiment, the front derailleur 332 further comprises a biasing member 334 that is operatively provided between the chain guide 324 and the second link member 332 to bias the chain guide 324 towards the retracted position. Thus, as seen in FIG. 30, the biasing member 334 has a coiled portion mounted on a pivot pin 336 that pivotally supports the second link member 332 to the chain guide 324.

Basically, the front derailleur 312 is identical to the front derailleur 12, as discussed above, except that: (1) the base member 322 is configured to be mounted to the bicycle frame 1 using the seat tube clamp 325; and (2), the chain restricting abutment 326 is configured to be elastically deformed by the bicycle chain 18 when the chain 18 is stuck between a tip of the tooth of the larger sprocket (i.e., the first sprocket 14) and the chain restricting abutment 326 during upshifting operation from the smaller sprocket (i.e. the second sprocket 16) to the larger sprocket. In view of the similarities between the front derailleurs 12 and 312, only the differences of the front derailleur 312 from the front derailleur 12 will be discussed herein for the sake of brevity.

Here, in the fourth embodiment, the base member 322 is a rigid member that is made of a suitable material such as a metallic material or a plastic material. As seen in FIGS. 29 and 30, the base member 322 has a frame mounting portion 322a that has a slot 322a1 for receiving a fixing bolt FB for mounting the front derailleur 312 to the seat tube clamp 325 (i.e., a mounting bracket). The frame mounting portion 322a also has an elongated projection 322a2 for engaging the seat tube clamp 325 to prevent relative rotation therebetween. The base member 322 also has a cable receiving portion 322b that receives the operation cable 20. Here, the cable receiving portion 322b has a stepped bore such that an outer casing abutment surface is formed between a first large diameter bore section and a second small diameter bore section. The first large diameter bore section is sized for receiving the outer casing 20a that abuts against the outer casing abutment surface. The second small diameter bore section is sized for receiving the inner cable 20b therethrough.

Now, the chain guide 324 will be discussed. As shown in FIGS. 29 to 32, the chain guide 324 is identical to the chain guide 24 of the first embodiment. Thus, the chain guide 324 includes an inner guide plate 340 and an outer guide plate 342. The inner guide plate 340 and the outer guide plate 342 are configured to form a chain guiding slot 344 therebetween as seen in FIGS. 31 and 32. The outer guide plate 342 is identical to the outer guide plate 42 of the first embodiment, and includes a base plate portion 342a and a chain guiding portion 342b in the same manner as discussed in the first embodiment. Similar to the first embodiment, the chain guide 324 further includes an upstream connecting part 346 connecting upstream ends of the inner and outer guide plates 340 and 342, and a downstream connecting part 348 connecting downstream ends of the inner and outer guide plates 340 and 342.

Similar to the first embodiment, the chain restricting abutment 326 is disposed at a front side of a front end of the chain guide 324. Also similar to the first embodiment, the chain restricting abutment 326 is positioned at the first axial distance D1 with respect to the inner guide plate 340 while the chain guide 324 is in the extended position. In addition, similar to the first embodiment, the chain restricting abutment 326 is disposed on a downwardly facing surface of the base member 322, and includes a protrusion 326a for restricting radial outward movement of the bicycle chain 18 during a downshift such that the bicycle chain 18 only moves from the first sprocket 14 to the second sprocket 16 at designated downshift regions of the first sprocket 14 as explained above in the first embodiment. In this way, a bottom surface of the protrusion 326a of the chain restricting abutment 326 is configured to contact an outer periphery 18b of the bicycle chain 18 when the base member 322 is mounted on the bicycle frame 1 and the bicycle chain 18 moves from a larger front sprocket (i.e., the first sprocket 14) toward an adjacent smaller front sprocket (i.e., the second sprocket 16).

Similar to the first embodiment, the chain restricting abutment 326 is disposed on the base member 322. For example, the chain restricting abutment 326 is attached to the base member 322 by the limit screws B1 and B2 that are screwed into threaded holes H1 and H2 of the base member 322. In particular, the chain restricting abutment 326 includes an attachment part 326b that is located in a recess 322c of the base member 322 and fastened to the base member 322 by the limit screws B1 and B2. In the fourth embodiment, the attachment part 326b of the chain restricting abutment 326 is a separate part from the protrusion 326a of the chain restricting abutment 326 as discussed below. In this way, the attachment part 326b can be made of a different material from the protrusion 326a. The attachment part 326b also functions to restrict looseness of the limit screws B1 and B2. The attachment part 326b is preferably made of non-metallic material such as a resin or rubber for frictionally retain the limit screws B1 and B2 inside the threaded holes H1 and H2.

However, in the fourth embodiment, the chain restricting abutment 326 is configured to be elastically deformed by the bicycle chain 18 that moves in the radially outward direction when the base member 322 is mounted on the bicycle frame 1 and the chain guide 324 moves from the retracted position toward the extended position. In particular, the chain restricting abutment 326 is at least partially made of an elastic material. For example, the chain restricting abutment 326 is at least partially made of an elastomer. Thus, the chain restricting abutment 326 is at least partially made of a non-metallic material. Also, preferably, the chain restricting abutment 326 is at least partially made of a resin material. In particular, at least the protrusion 326a of the chain restricting abutment 326 is made of an elastic material.

Figure 34:
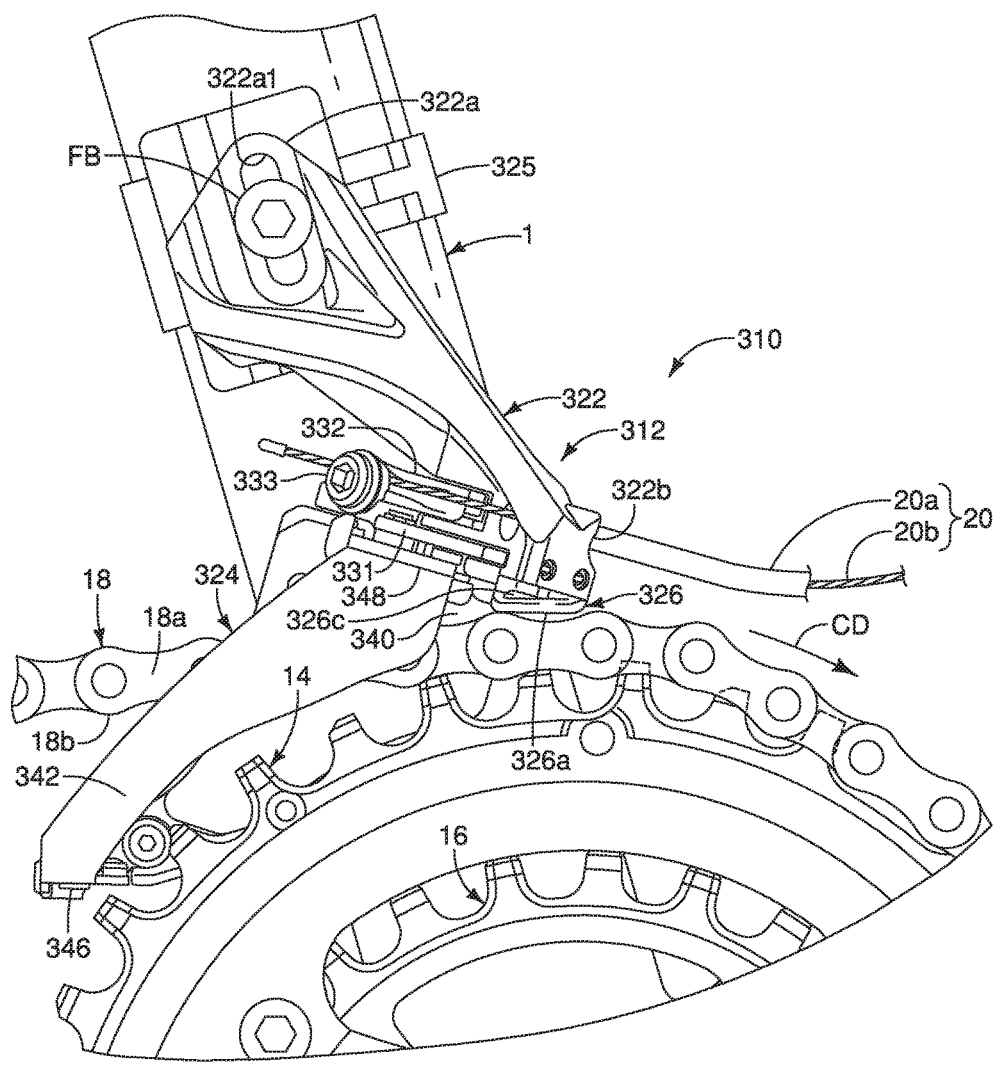
FIG. 34 is a partial side elevational view of the bicycle front derailleur illustrated in FIGS. 28 to 33 in which the bicycle front derailleur is mounted to the bicycle frame and the chain restricting abutment has been elastically deformed by the bicycle chain engaging chain restricting abutment.

Specifically, during a shifting operation from a smaller sprocket (i.e., the second sprocket 16) to a larger sprocket (i.e., the first sprocket 14), sometimes the chain 18 fails to improperly engage a tooth of the larger sprocket (i.e., the first sprocket 14). In such a situation, as seen in FIG. 34, the chain 18 can be lifted onto the tip of the tooth of the larger sprocket (i.e., the first sprocket 14) and pushed upwardly into the chain restricting abutment 326. As a result, the chain 18 could get stuck between the tooth of the larger sprocket (i.e., the first sprocket 14) and the chain restricting abutment 326. However, due to the elastic properties, the chain restricting abutment 326 will deform under this force to avoid damage of the chain 18 and/or the front derailleur 312. In other words, the chain restricting abutment 326 deforms to absorb a pushing force from the chain 18. To aid in the elastic deformation of the chain restricting abutment 326, the chain restricting abutment 326 includes an internal space 326c. In this way, the protrusion 326a can be deformed into the internal space 326c. In other words, the internal space 326c increases the ability for the chain restricting abutment 326 to deform in the event that the chain 18 gets stuck between the tooth of the larger sprocket (i.e., the first sprocket 14) and the chain restricting abutment 326.

Here, the chain restricting abutment 326 includes a through hole that comprises the internal space 326c of the chain restricting abutment 326. However, the internal space 326c can just be an internal void. For example, the internal space 326c can be formed as an extension of an attachment hole 326d that retains the attachment part 326b of the chain restricting abutment 326 to the protrusion 326a of the chain restricting abutment 326. In this way, an internal space can be formed inside of the protrusion 326a of the chain restricting abutment 326 that is not visible while the chain restricting abutment 326 is attached to the base member 322. While the chain restricting abutment 326 is mounted to the base member 322 in the fourth embodiment, it will be apparent from this disclosure the chain restricting abutment 326 is not limited to being mounted to base member 322. Rather, the chain restricting abutment 326 can be made of a deformable material and can be mounted to the chain guide, i.e. one of an end of inner guide plate 340 and an outer guide plate 342, or downstream connecting part 348.

Figure 35:
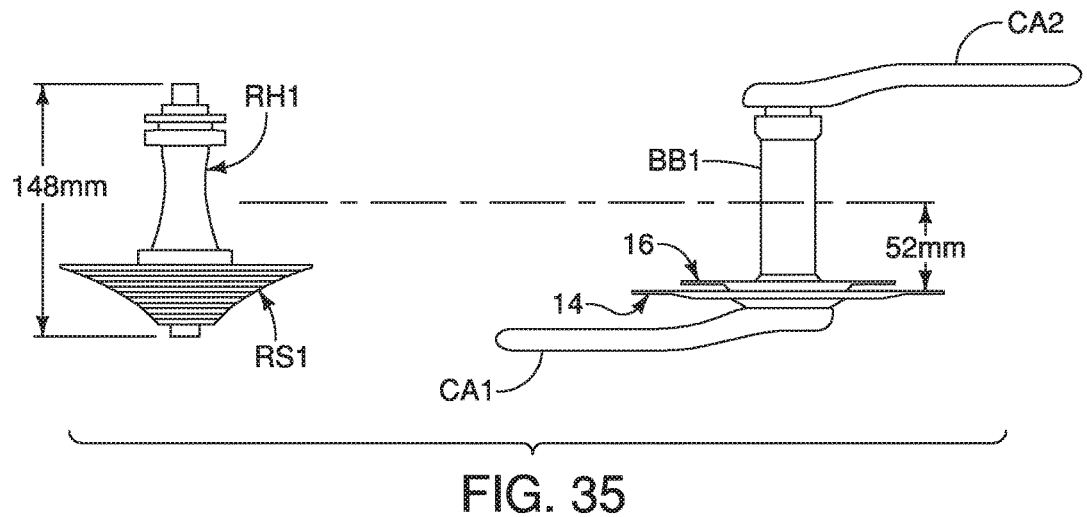
FIG. 35 is a top diagrammatic view of a first bicycle drive train having a first chainline arrangement.
Figure 36:
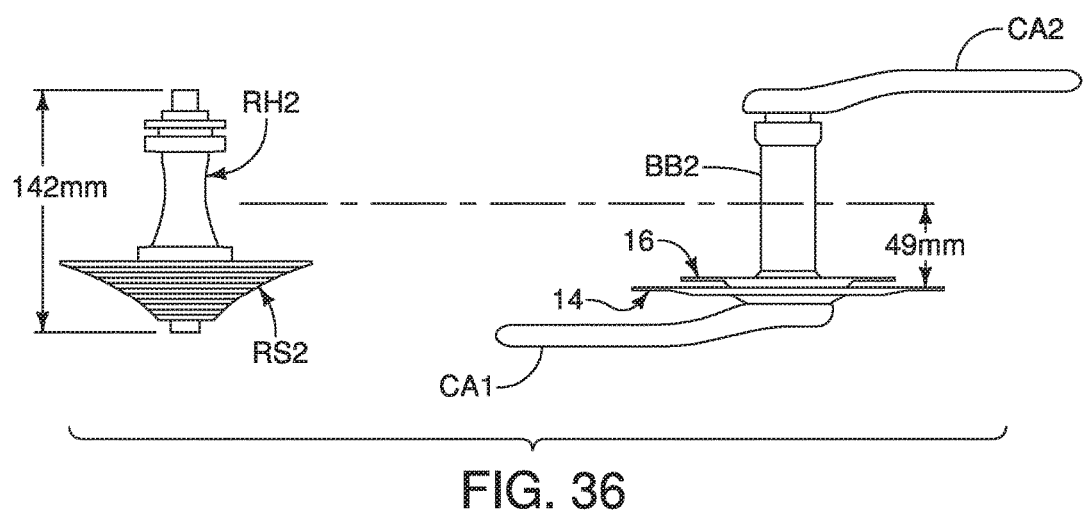
FIG. 36 is a top diagrammatic view of a second bicycle drive train having a second chainline arrangement.
Figure 40:
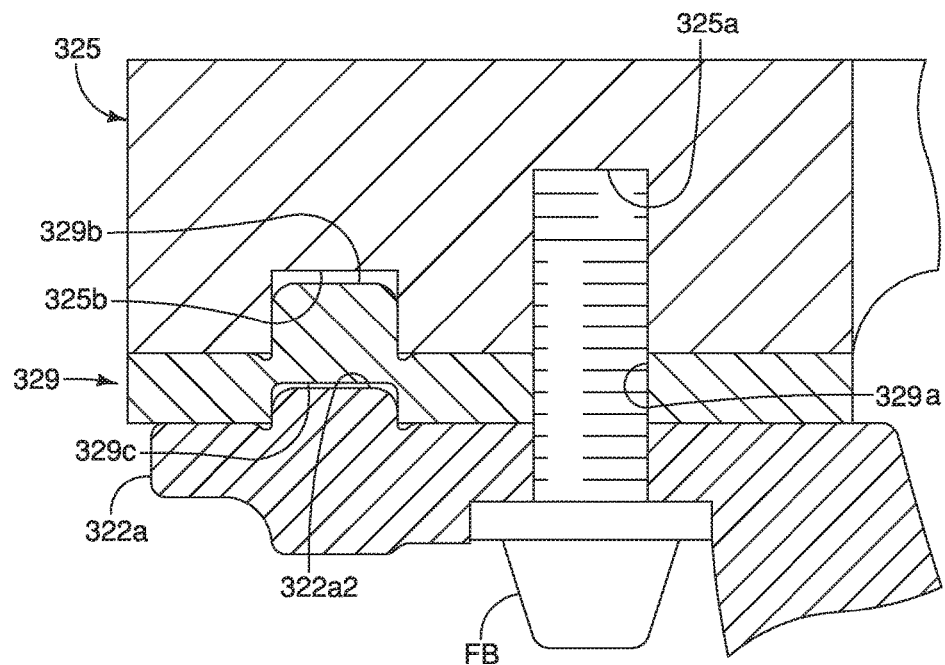
FIG. 40 is a cross sectional view of the connection of the base member to the mounting clamp with the spacer disposed therebetween as seen along section line 40-40 of FIG. 37.

Referring now to FIGS. 35 to 41, application of the front derailleur 312 can be used with a first chainline arrangement (FIG. 35) by using a spacer 329 as seen in FIGS. 37 and 40, and can be used with a second chainline arrangement (FIG. 36) by omitting the spacer 329 FIGS. 37 and 40. The first chainline arrangement illustrated in FIG. 35 is a wide chainline arrangement. On the other hand, the second chainline arrangement illustrated in FIG. 36 is a standard or narrow chainline arrangement as compared to the wide chainline arrangement illustrated in FIG. 35. The term "chainline" as used herein refers to the distance between the longitudinal centerline of the frame 1 and the centerline of the sprocket.

As illustrated in FIG. 35, the first and second sprockets 14 and 16 and the crank arms CA1 and CA2 are installed as part of the first chainline arrangement which further includes a bottom bracket BB1, a rear hub RH1 and a rear sprocket cassette RS1. In the first chainline arrangement, the rear hub RH1 has a rear frame spacing of one hundred forty-eight millimeters, which is wider than the rear hub RH2. To accommodate the wider dimension of the rear hub RH1, the bottom bracket BB1 and/or the crank arm CA1 are configured to mount the first and second sprockets 14 and 16 such that the centerline of the first sprocket 14 is about fifty-two millimeters from longitudinal centerline of the frame 1.

As illustrated in FIG. 36, the first and second sprockets 14 and 16 and the crank arms CA1 and CA2 are installed as part of the second chainline arrangement which further includes a bottom bracket BB2, a rear hub RH2 and a rear sprocket cassette RS2. In the second chainline arrangement, the rear hub RH2 has a rear frame spacing of one hundred forty-two millimeters. Thus, the bottom bracket BB2 and/or the crank arm CA1 are configured to mount the first and second sprockets 14 and 16 such that the centerline of the first sprocket 14 is about forty-nine millimeters from longitudinal centerline of the frame 1.

Referring now to FIGS. 37 to 41, the spacer 329 is used for mounting the base member 322 to the seat tube clamp 325. While a seat tube clamp is used in the fourth embodiment, it will be apparent from this disclosure that other types of mounts can be used with the spacer 329. In any case, the spacer 329 is configured to be selectively disposed between the base member 322 and the seat tube clamp 325 to adjust a position of the front derailleur 312 in a direction parallel to the rotational center axis A of the first and second sprockets 14 and 16.

Figure 41:
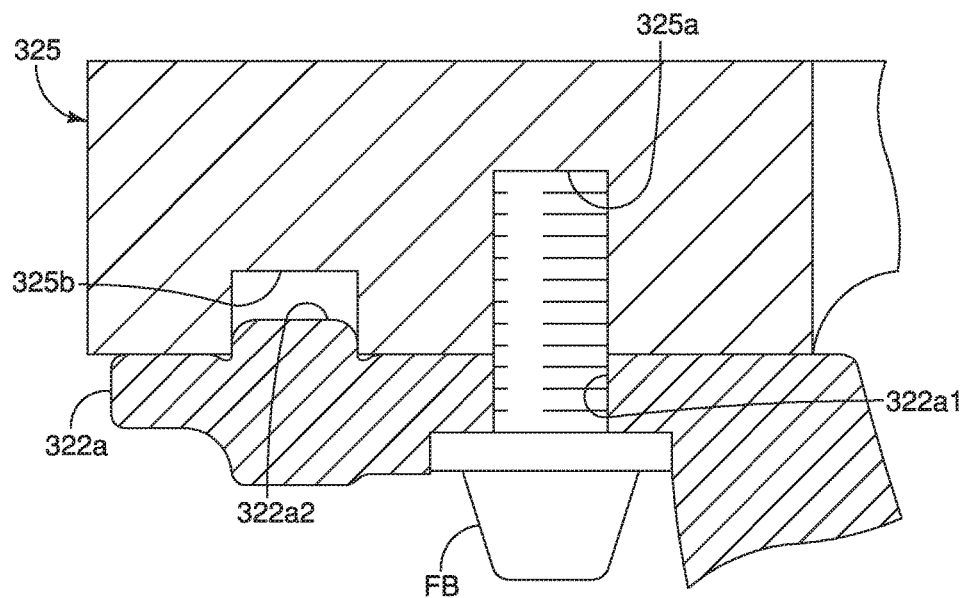
FIG. 41 is a cross sectional view of the connection of the base member to the mounting clamp without the spacer as seen along section line 41-41 of FIG. 38.

As best seen in FIGS. 39 to 41, the derailleur mounting portion of the seat tube clamp 325 is provided with a threaded hole 325a and a recess or groove 325b. The threaded hole 325a is configured to receive the fixing bolt FB. The groove 325b is configured to receive the elongated projection 322a2 of the base member 322 when the spacer 329 is omitted as seen in FIGS. 38 and 41. Thus, when the spacer 329 is omitted, the position of the front derailleur 312 can be optimized for the second chainline arrangement of FIG. 36.

As seen in FIGS. 39 to 41, the spacer 329 is provided with an opening or slot 329a, an elongated projection 329b and an elongated recess or groove 329c. When the spacer 329 is disposed between the base member 322 and the seat tube clamp 325 as seen in FIGS. 37 and 40, the fixing bolt FB extends through the slot 329a of the spacer 329 and the elongated projection 329b is received in the groove 325b of the seat tube clamp 325. Also when the spacer 329 is disposed between the base member 322 and the seat tube clamp 325 as seen in FIG. 40, the elongated projection 322a2 of the base member 322 is received in the groove 329c of the spacer 329. Thus, when the spacer 329 is used, the position of the front derailleur 312 can be optimized for the first chainline arrangement of FIG. 35.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle front derailleur. Accordingly, these directional terms, as utilized to describe the bicycle front derailleur should be interpreted relative to a bicycle in an upright riding position on a horizontal surface and that is equipped with the bicycle front derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, this invention can be applied to an electric front derailleur including an electric motor to actuate a linkage mechanism to move a chain guide in accordance with an electrical signal. Also unless specifically stated otherwise, the size, shape, location or orientation of the various components can be changed as needed and/or desired so long as the changes do not substantially affect their intended function. Further, unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member configured to be mounted on a bicycle frame;
   a chain guide configured to be movably coupled to the base member between a retracted position and an extended position to move a bicycle chain; and
   a chain restricting abutment including a contact surface that contacts the bicycle chain to restrict the bicycle chain from moving in a radially outward direction of a rotational center axis of a bicycle front sprocket when the base member is mounted on the bicycle frame and the chain guide moves from the extended position toward the retracted position.

2. The bicycle front derailleur according to claim 1, wherein
   the chain guide includes an inner guide plate and an outer guide plate, the outer guide plate including a base plate portion and a chain guiding portion protruding from the base plate portion toward the inner guide plate, the chain guiding portion being configured to contact a side surface of the bicycle chain when the base member is mounted on the bicycle frame and the chain guide moves from the extended position toward the retracted position, a first axial distance defined between the chain restricting abutment and the inner guide plate being smaller than a second axial distance defined between the chain guiding portion and the inner guide plate.

3. The bicycle front derailleur according to claim 1, wherein
   the chain restricting abutment is disposed on a downstream side of the chain guiding portion with respect to a chain driving direction.

4. The bicycle front derailleur according to claim 1, wherein
   the chain guide includes an inner guide plate and an outer guide plate, the outer guide plate including a base plate portion and a chain guiding portion protruding from the base plate portion toward the inner guide plate, the chain guiding portion being configured to contact a side surface of the bicycle chain when the base member is mounted on the bicycle frame and the chain guide moves from the extended position toward the retracted position, the outer guide plate is configured to define a non-contact space between the chain restricting abutment and the chain guiding portion in a chain driving direction, the non-contact space being configured not to contact the bicycle chain when the base member is mounted on the bicycle frame and the chain guide moves from the extended position toward the retracted position.

5. The bicycle front derailleur according to claim 1, wherein
the chain restricting abutment is disposed on the base member.

6. The bicycle front derailleur according to claim 5, wherein
the chain restricting abutment is disposed at a front end of the base member.

7. The bicycle front derailleur according to claim 5, wherein
the chain restricting abutment is disposed on a downwardly facing surface of the base member.

8. The bicycle front derailleur according to claim 7, wherein
the chain guide includes an inner guide plate and an outer guide plate, and
the contact surface of the chain restricting abutment is part of a protrusion disposed between the inner guide plate and the outer guide plate as viewed from a direction perpendicular to the rotational center axis when the base member is mounted on the bicycle frame.

9. The bicycle front derailleur according to claim 1, wherein
the chain guide includes an inner guide plate and an outer guide plate, and
the chain restricting abutment is disposed on an outer guide plate of the chain guide.

10. The bicycle front derailleur according to claim 9, wherein
the chain restricting abutment is disposed forward of the inner guide plate.

11. The bicycle front derailleur according to claim 10, wherein
the chain restricting abutment is integrally formed as a one-piece member of the outer guide plate.

12. The bicycle front derailleur according to claim 9, wherein
the chain restricting abutment is disposed at a front end of the outer guide plate.

13. The bicycle front derailleur according to claim 12, wherein
the outer guide plate includes a base plate portion and a chain guiding portion protruding from the base plate portion toward the inner guide plate, the chain guiding portion is configured to contact a side surface of the bicycle chain when the base member is mounted on the bicycle frame and the chain guide moves from the extended position toward the retracted position, and the chain restricting abutment is aligned with the chain guiding portion in a direction extending parallel to a chain driving direction.

14. The bicycle front derailleur according to claim 1, wherein
the chain guide includes an inner guide plate, an outer guide plate and a connecting part extending between the inner guide plate and the outer guide plate, the chain restricting abutment is disposed on the connecting part of the chain guide.

15. The bicycle front derailleur according to claim 14, wherein the chain restricting abutment is disposed at a front end of the chain guide.

16. The bicycle front derailleur according to claim 14, wherein
the contact surface of the chain restricting abutment is part of a protrusion protruding from the connecting part between the inner guide plate and the outer guide plate.

17. The bicycle front derailleur according to claim 1, wherein
the chain restricting abutment is configured to contact an outer periphery of the bicycle chain when the base member is mounted on the bicycle frame and the bicycle chain moves from a larger front sprocket toward an adjacent smaller front sprocket.

18. The bicycle front derailleur according to claim 1, wherein
the chain restricting abutment is at least partially made of an elastic material.

19. The bicycle front derailleur according to claim 1, wherein
the chain restricting abutment is configured to be elastically deformed by the bicycle chain that moves in the radially outward direction when the base member is mounted on the bicycle frame and the chain guide moves from the retracted position toward the extended position.

20. The bicycle front derailleur according to claim 1, wherein
the chain restricting abutment is at least partially made of a non-metallic material.

21. The bicycle front derailleur according to claim 20, wherein
the chain restricting abutment is at least partially made of a resin material.

22. The bicycle front derailleur according to claim 1, wherein
the chain restricting abutment is detachably connected to the base member.

23. A bicycle front derailleur according comprising:
a base member configured to be mounted on a bicycle frame;
a chain guide configured to be movably coupled to the base member between a retracted position and an extended position to move a bicycle chain; and
a chain restricting abutment configured to restrict the bicycle chain from moving in a radially outward direction of a rotational center axis of a bicycle front sprocket when the base member is mounted on the bicycle frame and the chain guide moves from the extended position toward the retracted position, the chain restricting abutment being at least partially made of an elastomer.

24. The bicycle front derailleur according to claim 1, wherein
the chain restricting abutment includes an internal space.

25. The bicycle front derailleur according to claim 24, wherein
the chain restricting abutment includes a through hole that comprises the internal space of the chain restricting abutment.

26. A bicycle drive train assembly including the bicycle front derailleur according to claim 1, the bicycle drive train assembly further comprising:
a first sprocket including a first body portion and a plurality of first teeth disposed on an outer periphery of the first body portion; and a second sprocket including a second body portion and a plurality of second teeth disposed on an outer periphery of the second body portion, the second sprocket having a fewer total number of the second teeth than a total number of the first teeth of the first sprocket.

27. The bicycle drive train assembly according to claim 26, wherein
the first teeth of the first sprocket include a set of downshift teeth configured to define a predetermined shift gate in which the bicycle chain shifts towards the second sprocket to move from the first sprocket to the second sprocket.

28. The bicycle drive train assembly according to claim 26, wherein
the first teeth of the first sprocket include a set of first downshift teeth, a set of second downshift teeth, a set of first driving teeth, and a set of second driving teeth,
the first downshift teeth being configured to define a first predetermined shift gate in which the bicycle chain shifts towards the second sprocket to move from the first sprocket to the second sprocket,
the second downshift teeth being configured to define a second predetermined shift gate in which the bicycle chain shifts towards the second sprocket to move from the first sprocket to the second sprocket,
the first driving teeth being disposed between the first and second downshift teeth on an upstream side of the first downshift teeth with respect to a chain driving direction, and
the second driving teeth being disposed between the first and second downshift teeth on a downstream side of the first downshift teeth with respect to the chain driving direction.

29. The bicycle drive train assembly according to claim 26, wherein
the first teeth of the first sprocket include at least one downshift tooth and at least one driving tooth,
the at least one downshift tooth has a first radial tooth height, and
the at least one driving tooth has a second radial tooth height that is larger than the first radial tooth height.

30. The bicycle drive train assembly according to claim 26, wherein
the plurality of first teeth includes:
at least one outer-link plate engaging tooth having a first chain engaging tooth width; and
at least one inner-link plate engaging tooth having a second chain engaging tooth width,
the first chain engaging tooth width is larger than an inner link space defined between an opposed pair of inner link plates of the bicycle chain and is smaller than an outer link space defined between an opposed pair of outer link plates of the bicycle chain, and
the second chain engaging tooth width is smaller than the inner link space.

31. The bicycle front derailleur according to claim 19, wherein
the chain restricting abutment is disposed on the base member.

32. The bicycle front derailleur according to claim 31, wherein
the chain restricting abutment is disposed at a front side of a front end of the chain guide.

33. The bicycle front derailleur according to claim 31, wherein
the chain restricting abutment is at least partially made of a non-metallic material.

34. The bicycle front derailleur according to claim 31, wherein
the chain restricting abutment includes an internal space.

35. The bicycle front derailleur according to claim 34, wherein
the chain restricting abutment includes a through hole that comprises the internal space of the chain restricting abutment.

\* \* \* \* \*